US010643174B1

(12) United States Patent
Hum

(10) Patent No.: US 10,643,174 B1
(45) Date of Patent: May 5, 2020

(54) DYNAMIC ITEM FACING

(71) Applicant: AMAZON TECHNOLOGIES, INC., Seattle, WA (US)

(72) Inventor: Marcus Hum, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 312 days.

(21) Appl. No.: 14/567,601

(22) Filed: Dec. 11, 2014

(51) Int. Cl.
    *G06Q 10/10*     (2012.01)
    *G06Q 10/08*     (2012.01)

(52) U.S. Cl.
    CPC .................................. *G06Q 10/087* (2013.01)

(58) Field of Classification Search
    CPC ..................... G06T 2207/10016; G65G 1/0407
    USPC ................................................... 235/383, 380
    See application file for complete search history.

(56) References Cited

U.S. PATENT DOCUMENTS

| | | | |
|---|---|---|---|
| 5,226,782 A * | 7/1993 | Rigling ................ | B65G 1/0407 198/347.3 |
| 6,236,736 B1 * | 5/2001 | Crabtree ............... | G01S 3/7865 235/383 |
| 7,225,980 B2 | 6/2007 | Ku et al. | |
| 7,949,568 B2 | 5/2011 | Fano et al. | |
| 7,983,448 B1 * | 7/2011 | da Vitoria Lobo ......... | G06K 9/00355 382/103 |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 2007/0050271 A1 * | 3/2007 | Ufford ................. | G06Q 10/087 705/28 |
| 2009/0245573 A1 * | 10/2009 | Saptharishi ............. | G06T 7/246 382/103 |
| 2011/0011936 A1 | 1/2011 | Morandi et al. | |
| 2012/0284132 A1 | 11/2012 | Kim et al. | |
| 2013/0026007 A1 * | 1/2013 | Poteat ..................... | B65B 51/04 198/468.11 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Rokib Masud
(74) *Attorney, Agent, or Firm* — Lindauer Law, PLLC

(57) ABSTRACT

Described are systems and techniques configured to control force applied by a force mechanism in a self-facing inventory location in a facility. An amount of force to be applied to the items stored at the inventory location may be determined by a user context. The user context may include one or more of presence of a user within a threshold distance of the inventory location, particular gesture by the user such as reaching for an item stowed at the inventory location, and so forth. The user context may be based on processing of images acquired in the facility. In one example, as the user reaches for the item stowed at the inventory location, the force mechanism reduces the amount of force applied, easing removal of the item. With picking complete, the force mechanism increases the amount of force applied causing the remaining items in the inventory location to be faced.

11 Claims, 11 Drawing Sheets

(56) References Cited

U.S. PATENT DOCUMENTS

2013/0284806 A1 10/2013 Margalit
2015/0086107 A1 3/2015 Dedeoglu et al.

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lalambent_devices_to_deliver_salient_information_in_supermarkets>.

Pop, Cristian, "Introduction to the BodyCom Technology", AN1391, DS01391A, Microchip Technology, Inc., May 2, 2011.

\* cited by examiner

602 — DETERMINE NO USER WITHIN THRESHOLD DISTANCE OF INVENTORY LOCATION

604 — APPLY FIRST LEVEL OF FORCE TO THE ITEM(S) USING A FORCE MECHANISM

606 — DETERMINE THE USER IS WITHIN THE THRESHOLD DISTANCE OF THE INVENTORY LOCATION

608 — APPLY A SECOND LEVEL OF FORCE TO THE ITEM(S) USING THE FORCE MECHANISM, WHEREIN THE SECOND LEVEL IS LESS THAN THE FIRST

700

702 APPLY FIRST LEVEL OF FORCE TO AN ITEM(S) AT AN INVENTORY LOCATION USING A FORCE MECHANISM

704 DETERMINE A GESTURE ASSOCIATED WITH THE INVENTORY LOCATION AS MADE BY A USER

706 APPLY A SECOND LEVEL OF FORCE TO THE ITEM(S) USING THE FORCE MECHANISM, WHEREIN THE SECOND LEVEL IS LESS THAN THE FIRST

DYNAMIC ITEM FACING

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth.

Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. A user may pick the item from an inventory location.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
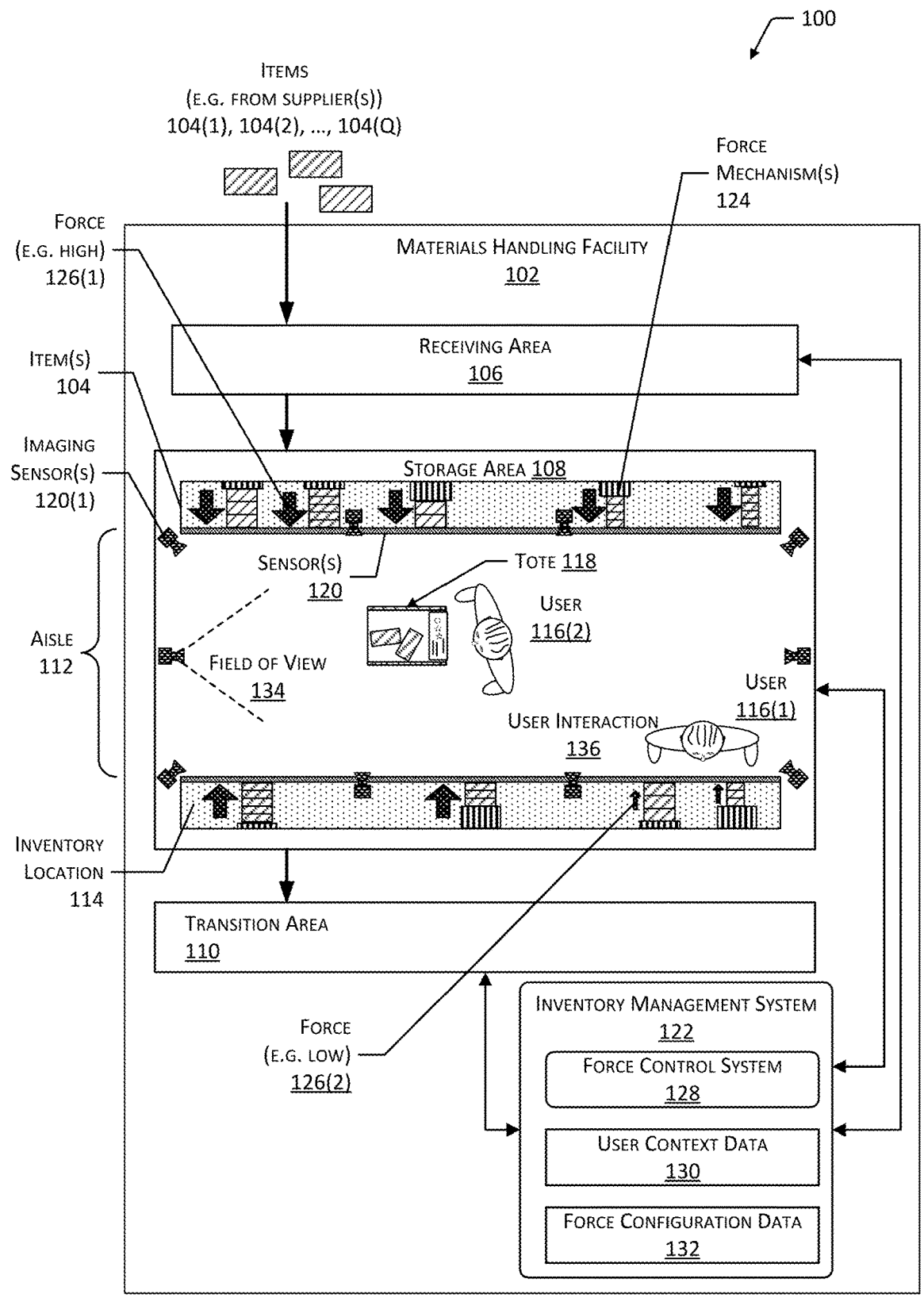
FIG. 1 is a block diagram illustrating a materials handling facility (facility) configured to control force applied to items in inventory locations, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for dynamically controlling an amount of force applied to items stored in auto- or self-facing inventory locations in a materials handling facility (facility). Facing may involve maintaining a particular placement of items with respect to the inventory location, such as having boxes of items neatly lined up such that the boxes are at a front of the inventory location. By facing items, users may be able to locate items more quickly during picking.

Conventional auto-facing devices may utilize a spring and a pusher plate in an inventory location, inclined plane, or other mechanism configured to apply or direct a force to items stowed therein. As an item is removed from the inventory location, the force displaces remaining items at the inventory location, drawing them to the front of the inventory location and filling in the gap left behind by the removed item. However, conventional auto-facing devices exhibit several drawbacks. For example, the amount of force applied may vary depending upon how full the inventory location is with items. In another example, conventional auto-facing systems may be difficult to restock due to the force being applied to items during restocking.

The facility may include, or have access to, an inventory management system. The inventory management system may be configured to maintain information about items, users, condition of the facility, and so forth. For example, the inventory management system may maintain data indicative of what items a particular user is directed to pick, historical data about items the particular user has picked, predicted paths through the facility, and so forth.

A plurality of sensors may be arranged within the facility and may generate sensor data. The sensors may include imaging sensors, radio frequency identification (RFID) tag readers, weight sensors, and so forth. The sensor data may be processed by the inventory management system to determine information such as a gesture of the user, identity of the user, location of the user in the facility, distance from a particular inventory location, whether the user is holding item(s), and so forth.

The inventory management system may include a force control system configured to control the force applied by a force mechanism associated with an inventory location. The force mechanism is configured to apply a force to one or more items in the inventory location. The force control system may access user context data to determine the amount of force to be applied and to generate force configuration data. The user context data may include information indicative of the user's actual or expected interaction with the inventory location. For example, the user context data may include information about the facility, gestures performed by the user, the items, historical activity data, location of users in the facility, proximity of users in the facility, gaze direction, predicted path through the facility, item interaction data, and so forth.

For example, the user context data may indicate that the user is performing a gesture, such as reaching a hand toward the inventory location, using an implement to retrieve an item, and so forth. The hand of the user may comprise an organic hand, prosthetic hand, or assistive device such as a "reach extender", pole with a hook, and so forth. Responsive to this, the force control system may be configured to reduce the amount of force applied to the items stowed in that inventory location, making them easier for the user to remove.

In another example, the user context data may indicate the user is holding an item and moving that item towards the inventory location, such as indicating the user is stowing the item at the inventory location. Responsive to this, the force control system may be configured to reduce the amount of force to the items, allowing for easier storage.

In yet another example, the user context data may indicate that the user is no longer reaching towards the inventory location, is moving away from the inventory location, or is otherwise no longer interacting with the inventory location. Responsive to this, the force control system may increase the force applied, causing the remaining items in the inventory location to be displaced towards the front of the inventory location and resulting in the items being "faced" or arranged in a predetermined fashion.

The inventory management system may generate force configuration data or other signals that are configured to direct a force mechanism. The force configuration data may include data indicative of a level of force to be applied by a force mechanism, identifier of a particular force mechanism, and so forth. For example, the force configuration data may specify a particular number of revolutions by an actuator such as an adjustment motor, a certain number of newtons of force, duration of time to apply a particular force, and so forth. In some implementations, the force configuration data may comprise Extensible Markup Language (XML) data that designates a particular force mechanism to exert a particular force on the inventory items.

The force configuration data may be used to direct operation of one or more force mechanisms. For example, the force configuration data may comprise data indicating the force mechanism at the inventory location aisle 2, rack B, shelf 6 is to be configured to apply a force of 9 newtons (N). The force mechanisms may comprise one or more devices such as motors, hydraulic actuators, pneumatic actuators, and so forth, which manipulate components. The components may include spring retention devices, height adjustment devices, and so forth, configured to control the amount of force applied to items stored by an inventory location. In one implementation, the force mechanisms may include a spring that may be selectively compressed to vary an amount of applied force. Continuing the example, the force mechanism may process the force configuration data and compress a certain length of spring to reduce the force applied by the spring to a pusher plate in contact with the item(s). In another implementation, the force mechanism may change a tilt or angle of an inventory location to change, with respect to the shelf storing the items, the force applied as a weight of the items. Continuing the example, a low-force condition may result in the shelf being horizontal, while a high-force condition may result in the shelf being tilted such that the weight of the items draws them towards the front of the inventory location.

The inventory management system may acquire, generate, or update the user context data at various times, allowing the force control system to control the force applied to items in the inventory locations in a dynamic fashion. In one example, as a user walks through the facility, the force mechanisms of inventory locations within a threshold distance of a current location of the user in the facility are configured to reduce the force applied on the items therein. In another example, as the user moves through the facility, the user context data may include a predicted path, anticipating where the user may be going. The inventory locations along this predicted path may be configured to apply less force to the items therein. Thus, as the user moves through the facility, the force applied to items in inventory locations at hand or ahead may be adjusted such that items are easily removed. As the user moves past, the force applied may be increased, resulting in the inventory locations being automatically re-faced such that the items therein are close to the front of the inventory location and ready for another user to pick.

The inventory management system may be configured to identify the user. Identification may comprise associating a user with a particular user account. For example, the identification may involve one or more of facial recognition, entry of one or more login credentials such as the username and password, detection of a tag, receiving data stored within a tag such as an RFID chip, and so forth. Once the user is identified, the user context data may also include information specific to the particular identity. For example, the user data may include a username or user identifier, role of the user in the facility, user preferences indicative of preferred force, and so forth. Continuing the example, the user data may indicate that the user is a stocker, tasked with placing or stowing items in the inventory locations.

The facility may include a library, museum, and so forth. As used herein, a facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

The systems and techniques described herein enable the facility to unobtrusively control the amount of force applied to items in inventory locations. Users experience a well-faced environment in which items are easily visible at the front of inventory locations while retaining ease of access to the items. Pickers have an easier experience in removing items while stockers are able to move quickly when restocking inventory locations. The force control system may also reduce accidental damage to items from excessive force, minimize buckling of items such as experienced when too much force is applied to a column of items and one is removed, and so forth. As a result of these or other benefits, overall operation of the facility and the user experience may be improved.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held.

As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), ..., 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), ..., 116(U) and totes 118(1), 118(2), 118, ..., 118(T), or other material handling apparatuses may move within the facility 102. For example, the user 116 may move about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. The totes 118 are discussed in more detail below with regard to FIG. 4.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

One or more sensors 120 may be configured to acquire information in the facility 102. The sensors 120 may include, but are not limited to, imaging sensors 120(1), weight sensors, proximity sensors, radio frequency (RF) receivers, microphones, temperature sensors, humidity sensors, vibration sensors, and so forth. The sensors 120 may be stationary or mobile, relative to the facility 102. For example, the inventory locations 114, the totes 118, or other devices such as user devices, which may contain sensors 120 configured to acquire sensor data. Continuing the example, the inventory locations 114 may contain imaging sensors 120(1) configured to acquire images of pick or placement of items 104 on shelves. The sensors 120 are discussed in more detail below with regard to FIG. 2.

During operation of the facility 102, the sensors 120 may be configured to provide information suitable for tracking how objects move within the facility 102. For example, a series of images acquired by an imaging sensor 120(1) may indicate removal of an item 104 from a particular inventory location 114 by the user 116 and placement of the item 104 on or at least partially within the tote 118.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be placed, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102 a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

One or more of the inventory locations 114 may include one or more force mechanisms 124. The force mechanisms 124 are configured to apply a force 126 to one or more items 104 in the one or more of the inventory locations 114. The force 126 may be sufficient to displace the items 104 within the one or more of the inventory locations 114. For example, the force 126 may be sufficient to push the items 104 up against a retention member at the front of the one or more of the inventory locations 114. The front of the inventory location 114 may be the portion of the inventory location 114 proximate to the user 116 during use, such as that the portion of the inventory location 114 that opens into the aisle 112 and from which the user 116 may pick an item 104.

The inventory management system 122 may include, or be in communication with, a force control system 128. The force control system 128 is configured to use user context data 130 to generate force configuration data 132. The user context data 130 may include the sensor data, previously stored information, and so forth. The user context data 130 may also include image data, such as that acquired by an imaging sensor 120(1) having a field of view (FOV) 134 that includes one or more of at least a portion of the user 116 or at least a portion of the inventory location 114.

The user context data 130 may provide information about a user interaction 136, such as the user 116 standing near an inventory location 114, reaching for an item 104 stowed therein, removing items 104 stowed at the inventory location 114 from a tote 116, and so forth. For example, the inventory management system 122 may determine user context data 130 indicative of a gesture. The gesture may be indicative of a pose, motion, set of movements, orientation, and so forth of one or more of the body of the user 116 or a portion thereof, an implement in use by the user 116, and so forth. For example, the gesture may comprise the user 116 reaching an empty hand towards the inventory location 114(4). In another example, the gesture may comprise the user 116 reaching towards the item 104 with a reach extender comprising a mechanism with a manipulator to grasp an item 104. Based on the user context data 130, the force control system 128 may generate force configuration data 132, which is configured to set the force mechanism 124 of the inventory location 114(4) to a particular level of force 126. Continuing the example, the force mechanism 124 may be transitioned from a first (high) force 126(1) of 15 newton to a second (low) force 126(2) of 2 N.

In another example, the user context data 130 may include a predicted path that indicates possible routes through the facility 102 by a particular user 116. The predicted path may be proximate to one or more of the inventory locations 114. For example, the predicted path may go past the inventory location 114(1) or may have inventory location 114(2) as a destination. The predicted path may be based on information such as the identity of the user 116, items 104 previously acquired by the user 116 at previous visits to the facility 102, and so forth. The force control system 128 may generate force configuration data 132 to set particular levels of force 126 at the inventory locations 114 along the predicted path. As a result, as the user 116 walks through the facility 102, the force 126 applied to the items 104 in the inventory locations 114 may be low as the user 116 approaches and may increase as the user 116 moves away from the inventory locations 114.

The user context data 130 may include information about operation of the facility 102, data about the items 104, the user 116 as an anonymous individual, the user 116 as an identified individual, data external to the facility 102, and so forth. For example, the user context data 130 may include location data indicative of a location of the one or more users 116 within the facility 102, data indicative that the user 116 is assigned to placing or stocking items 104, and so forth. The user context data 130 may be obtained or generated from sensor data, external data sources, user input, and so forth. For example, the sensor data acquired by the sensors 120 may include images of the user 116 in the facility 102. The inventory management system 122 may use the images to generate user context data 130 indicating the location of the user 116, identity of the user 116, the pose of the user 116 or a portion thereof such as a hand or implement, the user interaction 136, and so forth.

The force configuration data 132 comprises information indicative of the level of force 126 that the one or more force mechanisms 124 associated with one or more inventory locations 114 are to be configured to. The force configuration data 132 may be provided to the force mechanisms 124, which may then respond to the information, thus implementing the force 126 specified. For example, the force configuration data 132 may indicate that force mechanism 124(1) is to be set to a first (high) level of force 126(1) of about 15 N. The force mechanisms 124 may process the force configuration data 132 and actuate one or more devices to change the force 126 applied to the one or more items 104 that may be in the inventory location 114.

The force configuration data 132 may specify a particular value of force 126 to be applied, or may comprise instructions to place the force mechanism 124 or a portion thereof into a particular condition. For example, the force configuration data 132 may be expressed as a signal configured to drive a servomotor to perform a particular number of revolutions in a particular direction. Continuing the example, the signal may comprise serial data indicating a number of revolutions the servomotor is to turn, an analog signal activating the servomotor, and so forth.

The force configuration data 132 may include other information, such as an identifier indicating a particular inventory location 114 or force mechanism 124. For example, the force mechanism 124 may have a particular address used to identify the particular force mechanism 124 and allow for control of that particular force mechanism 124 and not others.

The force configuration data 132 may specify a duration to apply the force 126. For example, the force configuration data 132 may specify that a force 126 of 15 N is to be applied or generated for 5 seconds (s). In some implementations, the force configuration data 132 may specify a minimum or maximum force 126. For example, the force configuration data 132 may specify a maximum force of 21 N is to be applied or generated. The maximum force may be determined to avoid damage to the items 104. For example, the maximum force may be determined by testing the item and determining a maximum amount of force that may be applied before collapse, buckling, deformation, and so forth.

The force configuration data 132 may comprise information configured to apply a time-varying force 126. For example, the force configuration data 132 may be configured to apply 21 N of force 126 for 500 milliseconds (ms) and then 9 N of force 126 for 30 s. The use of time-varying force 126 may be used to overcome static friction between the bottom of the items 104 and the surface of the inventory location 114 upon which the items 104 rest.

The inventory management system 122 may provide updated user context data 130 to the force control system 128 for use in generating dynamic force configuration data 132. For example, as the user 116 moves through the facility 102, the user context data 130 may be updated to include information such as current location of the user 116 within the facility 102, what inventory locations 114 are within arm's reach of the user 116, proximity of other users 116, updating the predicted path, and so forth. The user context data 130 may be specific to an individual user 116 or may be combined across multiple users 116.

The force control system 128 may use different approaches to resolving conflicts between different levels of force 126 to be applied by force mechanism 124 to particular inventory locations 114 at a particular time. For example, a busy aisle 112 in which the inventory location 114(1) is located may include a first set of users 116 who are picking items 104 and a second set of users 116 who are placing items 104. In this situation, the force control system 128 may be configured to generate force configuration data 132 to actuate the force mechanisms 124 and apply the lowest force 126 associated with either of the two sets of user 116. In another example involving the same circumstances, the force control system 128 may configured to reduce threshold distances associated with first set of users 116 acting as pickers. As a result, when both the first and second set of users 116 are in the aisle 112, the force 126 applied by the force mechanisms 124 is not reduced until one of the first set of users 116 are closer to the inventory location 114 than compared to when only pickers are in the aisle.

The force control system 128 may be configured to generate force configuration data 132 for a particular inventory location 114 or a group of inventory locations 114. For example, the force configuration data 132 may be configured to change the force 126 as applied by all of the force mechanisms 124 on a particular rack of inventory locations 114. In another example, the force configuration data 132 may be configured to change the force 126 as applied by a single force mechanism 124 associated with a single inventory location 114 holding one type of item 104.

The user 116, facility operator, suppliers, and other parties may benefit from various actions taken by the inventory management system 122 to adjust the force 126 as applied by the force mechanisms 124 to items 104 at the inventory locations 114. For example, the items 104 may be automatically faced and presented in such a way that facilitates picking by having the items 104 readily visible from the aisle 112. In another example, the automatic facing with control over the applied force 126 may minimize damage to items 104 by avoiding spillage, crushing, damage upon removal, and so forth.

Furthermore, the facing of items 104 may be accomplished automatically and without intervention of an agent of the facility 102. As a result, the user 116 may more quickly and easily access the items 104, and operating costs associated with maintaining the agent at the facility 102 to manually face the items 104 at the inventory locations 114 may be reduced or eliminated.

Figure 2:
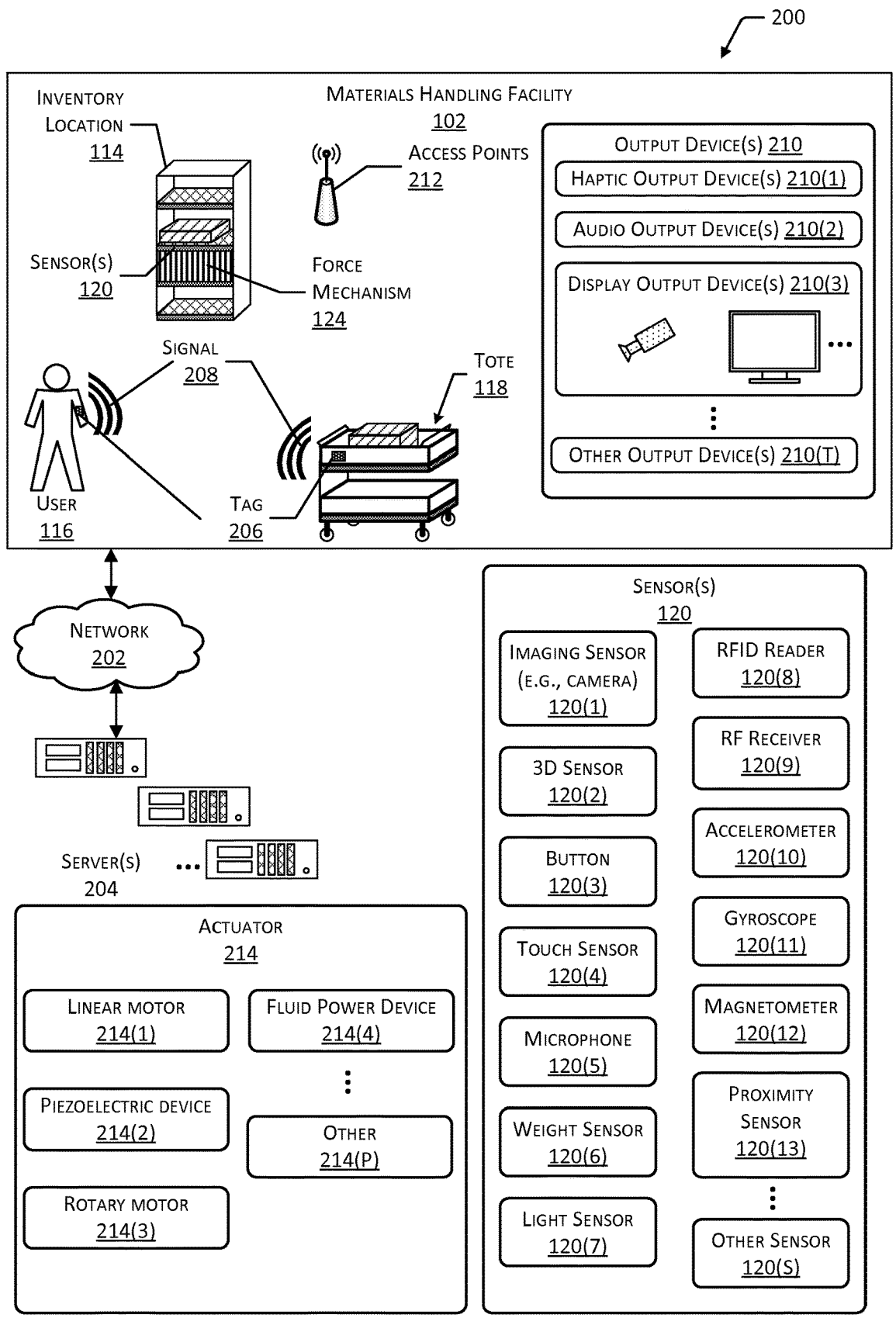
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 3.

The users 116, the totes 118, or other objects in the facility 102 may be equipped with one or more tags 206. The tags 206 are configured to emit a signal 208. In one implementation, the tag 206 may be a radio frequency identification (RFID) tag configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, that may be read and be used to determine identity and location.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, or ceiling, at an inventory location 114, on the tote(s) 118, may be carried or worn by the user(s) 116, and so forth.

The sensors 120 may include one or more imaging sensors 120(1). These imaging sensors 120(1) may include cameras configured to acquire images of a scene. The imaging sensors 120(1) are configured to detect light in one or more wavelengths including, but not limited to, terahertz, infrared, visible, ultraviolet, and so forth. The inventory management system 122 may use image data acquired by the imaging sensors 120(1) during operation of the facility 102. For example, the inventory management system 122 may identify items 104, users 116, totes 118, and so forth, based at least in part on their appearance within the image data.

One or more 3D sensors 120(2) may also be included in the sensors 120. The 3D sensors 120(2) are configured to acquire spatial or three-dimensional data, such as depth information, about objects within a sensor FOV. The 3D sensors 120(2) include range cameras, lidar systems, sonar systems, radar systems, structured light systems, stereo vision systems, optical interferometry systems, and so forth. The inventory management system 122 may use the three-dimensional data acquired to identify objects and determine one or more of a location, orientation, or position of an object. For example, the user context data 130 may include one or more of a location, orientation, position, or pose of the user 116 in three-dimensional space within the facility 102. Location is where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose provides information on a relative configuration of one or more elements of an object. For example, the pose of the user's 116 hand may indicate whether the hand is open or closed. In another example, the pose of the user 116 may include how the user 116 is holding an implement such as tongs, pole, reach extender, and so forth.

One or more buttons 120(3) may be configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the buttons 120(3) may be used to accept input from a user 116 such as a username and password associated with an account.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire audio data indicative of sound present in the environment. The sound may include user speech uttered by the user 116. In some implementations, arrays of microphones 120(5) may be used. These arrays may implement beamforming or other techniques to provide for directionality of gain. The inventory management system 122 may use the one or more microphones 120(5) to accept voice input from the users 116, determine the location of one or more users 116 in the facility 102, and so forth.

One or more weight sensors 120(6) may be configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. The inventory management system 122 may use the data acquired by the weight sensors 120(6) to identify an object, determine a location of an object, maintain shipping records, and so forth. For example, the weight sensors 120(6) at a particular location in the facility 102 may report a weight of the user 116, indicating the user 116 is present at that location. Based on that location, force control system 128 may generate force configuration data 132 configured to actuate a particular force mechanism 124 at an inventory location 114.

The sensors 120 may include one or more light sensors 120(7). The light sensors 120(7) may be configured to provide information associated with ambient lighting conditions such as a level of illumination. Information acquired by the light sensors 120(7) may be used by the inventory management system 122 to adjust a level, intensity, or configuration of the output device 210.

One more radio frequency identification (RFID) readers 120(8), near field communication (NFC) systems, and so forth, may also be provided as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth.

One or more RF receivers 120(9) may also be provided. In some implementations, the RF receivers 120(9) may be part of transceiver assemblies. The RF receivers 120(9) may be configured to acquire RF signals 208 associated with Wi-Fi Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source such as a device carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) provides information indicative of rotation of an object affixed thereto. For example, the tote 118 or other objects or devices may be equipped with a gyroscope 120(11) to provide user context data 130 indicative of a change in orientation.

A magnetometer 120(12) may be used to determine a heading by measuring ambient magnetic fields, such as the terrestrial magnetic field. The magnetometer 120(12) may be worn or carried by the user 116, mounted to the tote 118, and so forth. For example, the magnetometer 120(12) as worn by the user 116(1) may act as a compass and provide information indicative of which way the user 116(1) is facing.

A proximity sensor 120(13) may be used to determine presence of an object, such as the user 116, the tote 118, and so forth. The proximity sensors 120(13) may use optical, electrical, ultrasonic, electromagnetic, or other techniques to determine a presence of an object. In some implementations, the proximity sensors 120(13) may use an optical emitter and an optical detector to determine proximity. For example, an optical emitter may emit light, a portion of which may then be reflected by the object back to the optical detector to provide an indication that the object is proximate to the proximity sensor 120(13). In other implementations, the proximity sensors 120(13) may comprise a capacitive proximity sensor 120(13) configured to provide an electrical field and determine a change in electrical capacitance due to presence or absence of an object within the electrical field.

The proximity sensors 120(13) may be configured to provide sensor data indicative of one or more of a presence or absence of an object, a distance to the object, or characteristics of the object. An optical proximity sensor 120(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 120(1) such as a camera. Based on an apparent distance between the features of the structured light pattern, the distance to the object may be calculated. Other techniques may also be used to determine distance to the object. In another example, the color of the reflected light may be used to characterize the object, such as skin, clothing, tote 118, and so forth.

In some implementations, a proximity sensor 120(13) may be installed at the inventory location 114. Based on information from the proximity sensor 120(13), the force mechanism 124 may adjust the force 126 at the inventory location 114. For example, the optical proximity sensor 120(13) may determine that the user 116 is within a threshold distance, and the force mechanism 124 may, responsive to this determination, be configured to provide a predetermined force 126 to the items 104 at the inventory location 114.

The sensors 120 may include other sensors 120(S) as well. For example, the other sensors 120(S) may include ultrasonic rangefinders, thermometers, barometric sensors, hygrometers, or biometric input devices including, but not limited to, fingerprint readers or palm scanners.

The facility 102 may include one or more access points 212 configured to establish one or more wireless networks. The access points 212 may use Wi-Fi, NFC, Bluetooth, or other technologies to establish wireless communications between a device and the network 202. The wireless networks allow the devices to communicate with one or more of the inventory management system 122, the sensors 120, the tag 206, a communication device of the tote 118, or other devices.

The output devices 210 may also be provided in the facility 102. The output devices 210 are configured to generate signals that may be perceived by the user 116.

Haptic output devices 210(1) are configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as an imaging sensor 120(1) or light sensor 120(7). The output from the display output devices 210(3) may be monochrome or color. The display output devices 210(3) may be emissive, reflective, or both emissive and reflective. An emissive display output device 210(3) is configured to emit light during operation. For example, a light emitting diode (LED) is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays, transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

The force mechanism 124 may utilize one or more actuators 214. The actuators 214 are configured to apply a force, move another mechanical member, and so forth. For example, the actuator 214 may be configured to directly apply the force 126 to the items 104. The actuator 214 may also be configured to retract or pull another mechanical member, such as a pusher plate, away from a front of the inventory location. The actuator 214 may also be configured to control another member, such as a spring. In some implementations, the actuator 214 may comprise a servomotor that is designed to provide a particular output in response to input. For example, the servomotor may include an encoder and control circuitry configurable to produce the predetermined motion based on an input signal.

A linear motor 214(1) may be configured to provide a linear or straight-line motion. For example, the linear motor 214(1) may comprise a stator and rotor arranged in a linear fashion.

A piezoelectric device 214(2) may comprise one or more piezoelectric materials configured to generate a physical force upon application of electric current. For example, the piezoelectric device 214(2) may comprise a linear or rotary piezoelectric motor, piezoelectric stackup, and so forth.

A rotary motor 214(3) may be configured to provide a rotary motion. For example, the rotary motor 214(3) may comprise a stator and a rotor. In some implementations the rotary motor 214(3) may comprise a stepper motor. The stepper motor may be configurable to rotate to a predetermined angular position based on an input signal. A fluid power device 214(4) such as hydraulic or pneumatic actuator may also be used to apply a force. For example, the fluid power 214(4) device may comprise a piston driven by a working fluid under pressure.

Other actuators 214(P) may be used, such as solenoids, shape memory materials, electroactive polymers, and so forth. In some implementations, a combination of one or more of these actuators 214(P) may be used.

Figure 3:
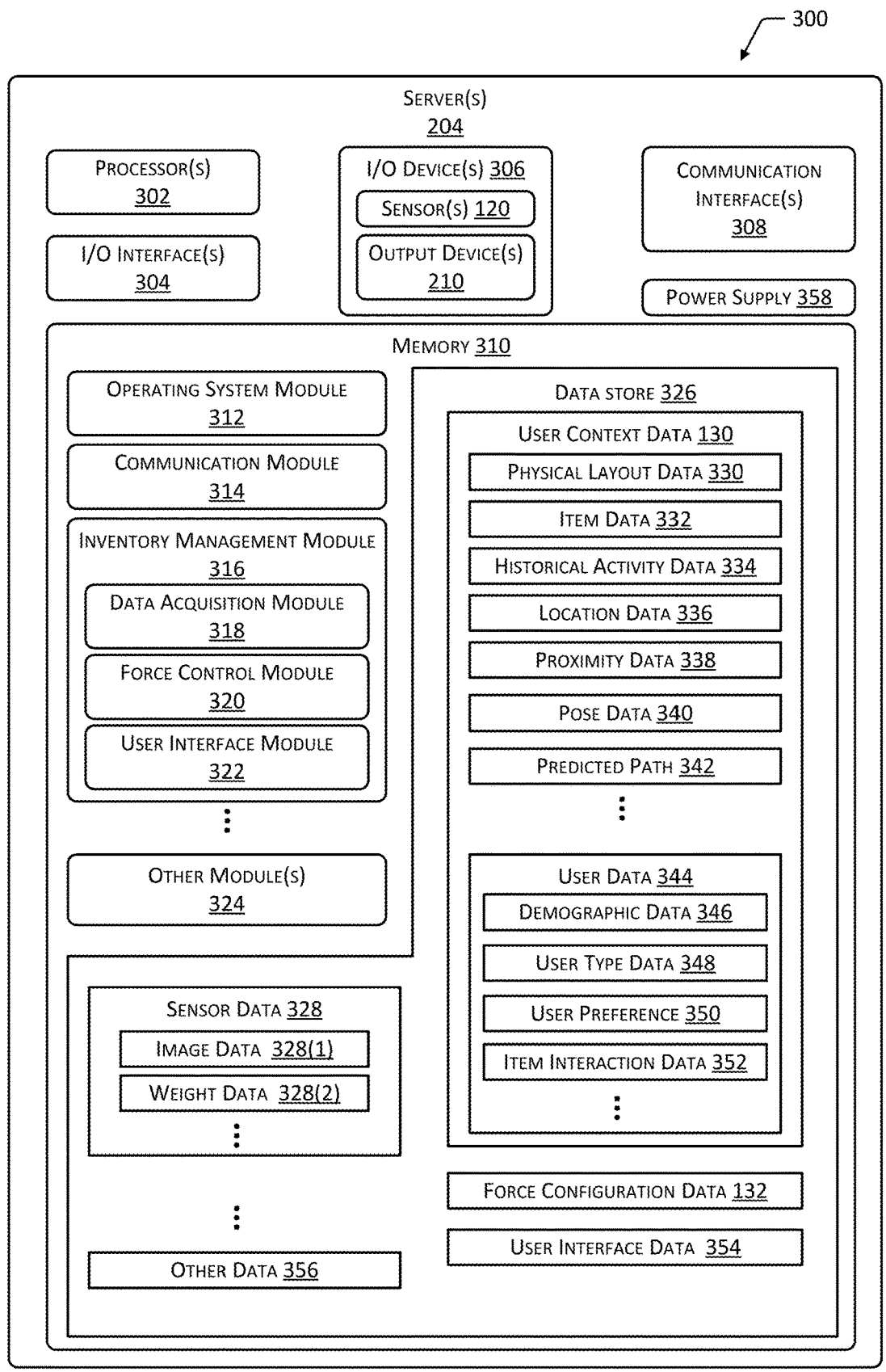
FIG. 3 illustrates a block diagram of a server configured to support operation of the facility, according to some implementations.

FIG. 3 illustrates a block diagram 300 of the server 204. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing," "software as a service (SaaS)," "platform computing," "network-accessible platform," "cloud services," "data centers," and so forth. Services provided by the server 204 may be distributed across one or more physical or virtual devices.

The server 204 may include one or more hardware processors 302 (processors) configured to execute one or more stored instructions. The processors 302 may comprise one or more cores. The server 204 may include one or more input/output (I/O) interface(s) 304 to allow the processor 302 or other portions of the server 204 to communicate with other devices. The I/O interfaces 304 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 304 may couple to one or more I/O devices 306. The I/O devices 306 may include input devices such as one or more of a keyboard, mouse, scanner, sensors 120, and so forth. The I/O devices 306 may also include output devices 210 such as one or more of a display output device 210(3), printer, audio output device 210(2), and so forth. In some embodiments, the I/O devices 306 may be physically incorporated with the server 204 or may be externally placed.

The server 204 may also include one or more communication interfaces 308. The communication interfaces 308 are configured to provide communications between the server 204 and other devices, such as the sensors 120, routers, the access points 212, and so forth. The communication interfaces 308 may include devices configured to couple to personal area networks (PANs), wired and wireless local area networks (LANs), wired and wireless wide area networks (WANs), and so forth. For example, the communication interfaces 308 may include devices compatible with Ethernet, Wi-Fi, and so forth.

The server 204 may also include one or more busses or other internal communications hardware or software that allow for the transfer of data between the various modules and components of the server 204.

As shown in FIG. 3, the server 204 includes one or more memories 310. The memory 310 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the server 204. A few example functional modules are shown stored in the memory 310, although the same functionality may alternatively be implemented in hardware, firmware, or as a system on a chip (SOC).

The memory 310 may include at least one operating system (OS) module 312. The OS module 312 is configured to manage hardware resource devices such as the I/O interfaces 304, the I/O devices 306, the communication interfaces 308, and provide various services to applications or modules executing on the processors 302. The OS module 312 may implement a variant of the FreeBSD operating system as promulgated by the FreeBSD Project; other UNIX or UNIX-like variants; a variation of the Linux operating system as promulgated by Linus Torvalds; the Windows Server operating system from Microsoft Corporation of Redmond, Wash., USA; and so forth.

Also stored in the memory 310 may be one or more of the following modules. These modules may be executed as foreground applications, background tasks, daemons, and so forth.

A communication module 314 may be configured to establish communications with one or more of the sensors 120, other servers 204, or other devices. The communications may be authenticated, encrypted, and so forth.

The memory 310 may store an inventory management module 316. The inventory management module 316 is configured to provide the inventory functions as described herein with regard to the inventory management system 122. For example, the inventory management module 316 may track items 104 between different inventory locations 114, to and from the totes 118, and so forth. The inventory management module 316 may include one or more of a data acquisition module 318, a force control module 320, a user interface module 322, or other modules 324.

The memory 310 may also include a data store 326 to store information. The data store 326 may use a flat file, database, linked list, tree, executable code, script, or other data structure to store the information. In some implementations, the data store 326 or a portion of the data store 326 may be distributed across one or more other devices including other servers 204, network attached storage devices, and so forth.

The data acquisition module 318 is configured to acquire sensor data 328 from one or more of the sensors 120. For example, the data acquisition module 318 may be configured to receive image data 328(1) comprising images from the imaging sensors 120(1) and location data 328(2) that may be based on data from weight sensors 120(6), proximity sensors 120(13), and so forth.

The sensor data 328 may be stored using the data store 326. The sensor data 328 comprises information acquired from, or based on, the one or more sensors 120. As described above, the sensors 120 may include an imaging sensor 120(1) that is configured to acquire one or more images. These images may be stored as image data 328(1). The image data 328(1) may comprise information descriptive of a plurality of picture elements or pixels. The weight sensors 120(6) are configured to acquire weight data 328(2) that is representative of the weight of objects within the facility 102. Other sensor data 328 such as audio data from the one or more microphones 120(5), and so forth, may also be stored using the data store 326.

In some implementations, the data acquisition module 318 may analyze the sensor data 328 to generate user context data 130. For example, the data acquisition module 318 may process the sensor data 328 to identify a user 116, determine a particular gesture such as a hand reaching for an inventory location 114, and so forth. The user context data 130 may be stored, at least in part, using the data store 326. In some implementations, a portion of the user context data 130 may be retrieved from other data stores or devices. The user context data 130 is configured to provide information about one or more of the following: operation of the facility 102, data about the items 104, the user 116 as an anonymous individual, the user 116 as an identified individual, and so forth.

Facial recognition may include analyzing facial characteristics that are indicative of one or more facial features in an image, three-dimensional data, or both. For example, the face of the user 116 may be detected within one or more of the images of the image data 328(1). The facial features include measurements of, or comparisons between, facial fiducials or ordinal points. The facial features may include eyes, mouth, lips, nose, chin, ears, face width, skin texture, three-dimensional shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors as descriptive of a human face may be known as "eigenfaces" or "eigenimages".

The image processing described in this disclosure may be performed at least in part using one or more of the following tools or techniques. In one implementation, the facial recognition or other image processing described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 328(1). In another implementation, the EyeFace SDK as promulgated by Eyedea Recognition Ltd. of Prague, Czech Republic, may be used to process the image data 328(1). The OpenBR library and tools as originated by MITRE Corporation of Bedford, Mass., USA, and McLean, Va., USA, and promulgated by the OpenBR group at openbiometrics.org may also be used in some implementations for image processing.

Other techniques such as artificial neural networks (ANN), active appearance models (AAM), active shape models (ASM), PCA, and so forth, may also be used to process the image data 328(1). For example, the ANN may be a trained using a supervised learning algorithm such that object identifiers are associated with images of particular objects within training images provided to the ANN. Once trained, the ANN may be provided with the image data 328(1) and may provide as output the object identifier.

In other implementations, other techniques may be used to recognize objects such as faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 116. The eigenvectors or other measurements may be compared with previously stored characteristics to determine the identity of the user 116 in the image or to distinguish one user 116 from another.

Clothing recognition analyzes images to determine what articles of clothing, ornamentation, and so forth, the user 116 is wearing or carrying in the facility 102. Skin and hair detection algorithms may be used to classify portions of the image that are associated with the user's 116 skin or hair. Items that are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. The clothing may be used to identify the user 116 or to distinguish one user 116 from another. For example, the user 116(1) may be distinguished from the user 116(2) based at least in part on the user 116(1) wearing a hat and a red shirt while the user 116(2) is not wearing a hat and is wearing a blue shirt.

Gait recognition techniques analyze one or more of images, three-dimensional data, or other data, to assess how a user 116 moves over time. Gait comprises a recognizable pattern of movement of the user's 116 body that is affected by height, age, and other factors. Gait recognition may analyze the relative position and motion of limbs of the user 116. Limbs may include one or more arms, legs, and in some implementations, the head. In one implementation, edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116 or to distinguish one user 116 from another.

In some implementations, identity may be based on a combination of these or other recognition techniques. For example, the user 116 may be identified based on clothing recognition, gait recognition, and facial recognition. The different recognition techniques may be used in different situations or in succession. For example, clothing recognition and gait recognition may be used at greater distances between the user 116 and the imaging sensors 120(1) or when the user's 116 face is obscured from view by the imaging sensor 120(1). In comparison, as the user 116 approaches the imaging sensor 120(1) and their face is visible, facial recognition may be used. Once identified, such as by way of facial recognition, one or more of gait recognition or clothing recognition may be used to track the user 116 within the facility 102.

In other implementations, other techniques for object recognition may be employed. For example, facial recognition may use iris detection and recognition, clothing recognition may use embedded tags 206, gait recognition may utilize data from weight sensors 120(6), and so forth.

Other techniques may be used to identify objects. For example, artificial neural networks, cascade classifiers, support vector machines, and so forth, may be used to process the image data 328(1) of an event and identify a hand of a user 116, the item 104 that was removed from the inventory location 114, identify the user 104, and so forth.

The user context data 130 may include physical layout data 330. The physical layout data 330 provides a mapping of physical locations within the physical layout of devices and objects such as the sensors 120, inventory locations 114, force mechanisms 124 associated with the inventory locations 114, and so forth. For example, the physical layout data 330 may indicate the coordinates within the facility 102 of an inventory location 114, an RFID reader 120(8) close to that inventory location 114, and so forth. In one implementation, the inventory management module 316 may access the sensor data 328 and the physical layout data 330 to determine a distance between two objects, such as between the user 116 and an inventory location 114. In another implementation, the inventory management module 316 may access the sensor data 328 and the physical layout data 330 to determine a gesture, such as the user 116 reaching a hand or implement toward a particular inventory location 114.

Item data 332 may also be included in the user context data 130. The item data 332 may comprise information associated with the items 104. The information may include one or more inventory locations 114 at which one or more of the items 104 are stored. The item data 332 may also include order data, SKU or other product identifier, price, quantity on hand, weight, expiration date, images of the item 104, detail description information, ratings, ranking, force limit data, and so forth. For example, the force limit data may indicate one or more of minimum, recommended, or maximum force 126 to be applied to the item 104. The inventory management module 316 may store information associated with inventory management functions in the item data 332.

The user context data 130 may also include historical activity data 334, location data 336, proximity data 338, or pose data 340. The historical activity data 334 provides information about the user's interactions 136 with the facility 102 and the objects therein, such as the items 104, the inventory locations 114, other users 116, the totes 118, and so forth. For example, the historical activity data 334 may indicate one or more of a user 116, a time of entry to the facility 102, a route taken while in the facility 102, a list of items 104 that have been picked or placed, and so forth. The historical activity data 334 may be associated with the user 116 who has been identified or remains unidentified. In some implementations, the historical activity data 334 may be retrieved, such as in the circumstance of an identified user 116. For example, the user 116 may be identified upon entry to the facility 102. After identification, historical activity data 334 associated with a user account of the user 116 may be retrieved from the data store 326. The data acquisition module 318 may use the historical activity data 334 to generate the predicted path.

The location data 336 comprises information indicative of the user's 116 location in the facility 102. The location data 336 may be expressed in absolute terms or relative terms. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 114 along the heading of 169, and so forth. The location data 336 may be used to determine user context data 130. For example, based on the location data 336 in the facility 102, and using the information about inventory locations 114 and the corresponding items 104 therein, the force control module 320 may determine the user context data 130 that indicates the force mechanisms 124 that are nearby the location. In some implementations, certain portions of the facility 102 may be blacked out such that location data 336 is not collected by the sensors 120. For example, movements within a break room or a restroom are not tracked.

The proximity data 338 provides information that is indicative of a spatial arrangement between the user 116 and another user 116, inventory location 114, force mechanism 124, and so forth. For example, the proximity data 338 may indicate that the user 116(1) is within a threshold distance of the user 116(2). In some implementations, the threshold distances may be specified for individual inventory locations 114. The threshold distances may be static or dynamically adjusted. Based at least in part on the proximity data 338 indicating that the user 116 is within the threshold distance of the inventory location 114, the force configuration data 132 may be generated to set the particular force 126 at the inventory location 114. For example, the threshold distance may be statically configured to 3 m between user 116 and inventory location 114. The force control module 320 may use the proximity data 338 to generate the force configuration data 132. Continuing the example, the force control module 320 may reduce the force 126 at an inventory location 114 when the user 116 is within 3 m. In another example, the threshold distances may be dynamically adjusted, such as changing to a shorter distance when multiple users 116 are present in the same aisle 112.

The pose data 340 provides information about a pose of the user 116. The pose comprises a relative configuration of one or more parts of the user's 116 body. For example, the pose may comprise the user 116 standing or sitting, reaching with an open hand, reaching with an item 104 grasped in the hand, reaching with a closed hand, and so forth. The pose data 340 may be indicative of a direction, such as a gaze direction indicating a direction the user 116 is looking. In some implementations, the pose data 340 may be determined by processing the image data 328(1). Based at least in part on the location data 336 of the user 116 and the pose data 340, it may be determined what inventory location 114 the user 116 is interacting with. By using this information, the force control module 320 may be able to determine when the user 116 is attempting to pick or place an item 104 at an inventory location 114, and adjust the force 126 provided by the corresponding force mechanisms 124. For example, two users 116(1) and 116(2) may be present next to an inventory location 114(4). The user 116(1) is pushing the tote 118 down the aisle 112 and is not reaching towards any inventory location 114 in the aisle 112. As a result, the force control module 320 takes no action responsive to the actions of the user 116(1). In comparison, the user 116(2) reaches towards the inventory location 114(4). Responsive to this user interaction 136, the force control module 320 generates force configuration data 132 to set the force mechanism 124 of the inventory location 114(4) to a lower force 126(2) to facilitate picking of the item 104 at the inventory location 114(4).

In other implementations, other directional data or orientation associated with the user 116 may be determined. For example, the directional data may indicate overall orientation of the user's 116 body, the direction of their head, and so forth.

The user context data 130 may also include the predicted path 342. The predicted path 342 may indicate one or more possible routes through the facility 102 taken by the user 116. The user 116 may be anonymous or identified, and likewise the predicted path 342 may be based on anonymous or specific user 116 identities. For example, the predicted path 342 may be based on information acquired from the anonymous actions of other users 116, the historical activity data 334 associated with the particular user identity, and so forth. For example, an anonymous user 116 entering the facility 102 may have a predicted path 342 that reflects the routes taken within the facility 102 by other users 116. In comparison, an identified user 116, for which richer user context data 130 is available may have a different or more specific predicted path 342. The predicted path 342 may also be based at least in part on the presence of other users 116 at one or more locations within the facility 102.

In some implementations, the predicted path 342 may also comprise a time series indicating estimated locations within the facility 102 at particular times. For example, the predicted path 342 may be based on the historical navigation path data of one or more users 116. Continuing the example, the historical navigation path data may indicate that a significant percentage of the users 116 have gone through a particular aisle 112 even when no items 104 within the aisle 112 are scheduled for picking. In this example, the predicted path 342 for a particular user 116 may include the assumption that this particular user 116 will also enter that aisle 112, given the history of other users. Furthermore, based on previously acquired data, if the items 104 in that aisle 112 are determined to have a probability of a spontaneous pick by the user 116 that is below a threshold value, the force 126 applied to that item 104 in the inventory location may remain unchanged. For example, if the user 116 has never picked a package of pickled pomegranates, the force control module 320 may leave the force 126 high on the inventory location storing this item, even when the user 116 is within a threshold distance of the inventory location.

The data acquisition module 318 may also be configured to generate the predicted path 342 of the user 116. The predicted path 342 may be proximate to one or more inventory locations 114, may begin at an inventory location 114, may end at an inventory location 114, and so forth. The predicted path 342 may be expressed as data of different levels of specificity or granularity. For example, the predicted path 342 may be indicative of coordinates within the facility 102, inventory locations 114, aisles 112, and so forth. Different data structures may be used to store the predicted path 342, including linked lists, trees, images, and so forth. For example, the predicted path 342 may lead the user 116 down the aisle 112 and past several inventory locations 114. The predicted path 342 may comprise data that is representative of a potential physical path that may be followed by the user 116 through the facility 102.

In some implementations, the predicted path 342 may be based on other user context data 130. The predicted path 342 may take into account the physical layout of the facility 102, the current location of the user 116, current direction of motion of the user 116, previous movement of the user 116 within the facility 102, movement of other users 116 within the facility 102, and so forth. For example, the inventory management module 316 may provide historical activity data 334 indicative of how other users 116 have moved through the facility 102. Based at least in part on this information, the data acquisition module 318 may generate a predicted path 342. In some implementations, a plurality of predicted paths 342 may be determined for a particular user 116 or group of users 116(U). These different predicted paths 342 for users 116 may be assigned different probability values. In some implementations, the predicted path 342 may include user data that is specific to a particular identity of a user 116. For example, the predicted path 342 may include information such as the previous picks of prior visits made by the same user 116, information about that user's 116 preferred paths through the facility 102, and so forth.

The user context data 130 may also include user data 344. The user data 344 comprises information specific to an identified user 116. For example, the user data 344 may include a username, legal or "real" name, user identifier, account number, and so forth, to identify a user 116. The user data 344 may be acquired from a user 116 during a registration process. For example, at initial use of the facility 102, an image of the user 116, information such as the user's 116 name, account name, preferences, and so forth, may be acquired by the server 204. Facial characteristics and other information may be derived from the image of the user 116. Continuing the example, the user 116 may use a kiosk to provide the image and the information.

Once the user 116 has been identified, the user data 344 associated with the identified user 116 may be retrieved, such as from the server 204. For example, facial recognition techniques may be used to determine the identity of the user 116, and the user data 344 may be retrieved. The user data 344 may include demographic data 346, user type data 348, user preferences 350, item interaction data 352, or other information.

In some implementations, anonymous users 116 may still be distinguishable from other anonymous users 116 in the facility 102. In some implementations, users 116 unassociated with an identity may be issued a temporary identity. Thus, the user 116 that is identified may be associated with a particular user account, while an anonymous user 116 may be differentiated from another user 116 and associated with the temporary identity.

Individual users 116 or groups of users 116 may selectively provide user data 344 for use by the inventory management system 122, may authorize collection of the user data 344 during use of the facility 102, or may authorize access to user data 344 obtained from other systems. For example, a user 116 may opt-in to collection of the user data 344 to receive enhanced services while using the facility 102.

The demographic data 346 may comprise information indicative of the user's 116 skills, address, contact information, physical abilities, facial characteristics, biometric information, and so forth. For example, the demographic data 346 may include data indicative of a fingerprint pattern of the user 116.

The user type data 348 provides information indicative of a role of the user 116 within the facility 102. For example, the user type data 348 may indicate that the user 116 is a "stocker", "picker", "manager", "customer", and so forth. The force control module 320 may use the user type data 348 to generate the force configuration data 132. For example, the force mechanisms 124 may be configured to apply less force 126 to items 104 when the user 116 has a user type data 348 of "stocker" than compared to when the user 116 has a user type date 348 of "picker". The lesser force 126 may allow the "stocker" to more quickly restock the inventory location 114.

The user preferences 350 may include information such as preferred distance thresholds, preferred force 126 levels, and so forth. For example, the user preference 350 may include threshold distance data indicating that the user 116 prefers to have the force 126 changed for inventory locations 114 within 2 m of the user 116. The user preferences 350 may be entered by the user 116, preconfigured, adjusted based on other data, and so forth. The preferred distance thresholds or other thresholds may be modified based on the physical layout data 330. For example, the threshold distance may be within a "line of sight", such as between the user 116 and inventory locations 114 that are within the same aisle 112.

The item interaction data 352 comprises information about how the user 116 has interacted with one or more items 104. The item interaction data 352 may include information about how the user 116 has handled the item 104, quantity handled simultaneously, and so forth. Handling may include, but is not limited to, one or more of the following: touching, moving, manipulating, activating, or inspecting the item 104. For example, the item interaction data 352 may indicate the user 116 typically picks a quantity of three of the items 104. Based on this item interaction data 352, the force control module 320 may be configured to reduce the force 126 to the items 104 to a particular level to facilitate simultaneously picking multiple quantities of the items 104.

The force control module 320 is configured to access the user context data 130 and generate force configuration data 132 that may be used to control the force mechanisms 124 at one or more inventory locations 114. The force control module 320 may be configured to generate or update user context data 130 as the user 116 moves about the facility 102.

The force control module 320 may send the force configuration data 132 to one or more of the force mechanisms 124. The force mechanisms 124 may respond to the force configuration data 132 by assuming a particular physical state, such as increasing or decreasing force 126 on one or more items 104 at the inventory locations 114.

The user interface module 322 is configured to generate user interface data 354. The user interface data 354 may include one or more controls with which the user 116 may provide input to the force control module 320. For example, the user interface data 354 may be configured to provide a user interface that accepts input from the user 116 to set user preferences 350.

The user interface data 354 may comprise commands, instructions, tags, markup language, images, color values, text, or other data. For example, the user interface data 354 may be expressed as Hypertext Markup Language (HTML), Cascading Style Sheets (CSS), JavaScript, and so forth. One or more output devices 210 are configured to use the user interface data 354 to present the user interface which may be perceived by the user 116. The user interface may include one or more elements including visual, haptic, audible, olfactory, and so forth. For example, the user interface may be a graphical user interface (GUI), audible user interface, haptic user interface, or a combination thereof.

The other modules 324 may also be present in the memory 310. For example, an accounting module may be configured to use data from one or more of the sensors 120 to bill the user 116 or an account associated with the user 116 for items 104 picked from the inventory locations 114.

The force configuration data 132 may also be stored in the data store 326. The force configuration data 132 may include data indicative of a level of force to be applied by a force mechanism 124, identifier of a particular force mechanism 124, duration to apply the force 126, and so forth. For example, the force configuration data 132 may specify a particular number of revolutions by an adjustment motor, a certain number of newtons of force 126, and so forth. In some implementations, the force configuration data 132 may comprise XML data that designates a particular force mechanism 124 to exert a particular force 126 on the inventory items 104 at the inventory locations 114.

The data store 326 may also include other data 356. For example, the other data 356 may include information such as configuration files, loading dock status, tote 118 availability, and so forth.

The server 204 may also include a power supply 358. The power supply 358 is configured to provide electrical power suitable for operating the components in the server 204. The power supply 358 may comprise one or more of photovoltaic cells, batteries, wireless power receivers, fuel cells, capacitors, and so forth.

Figure 4:
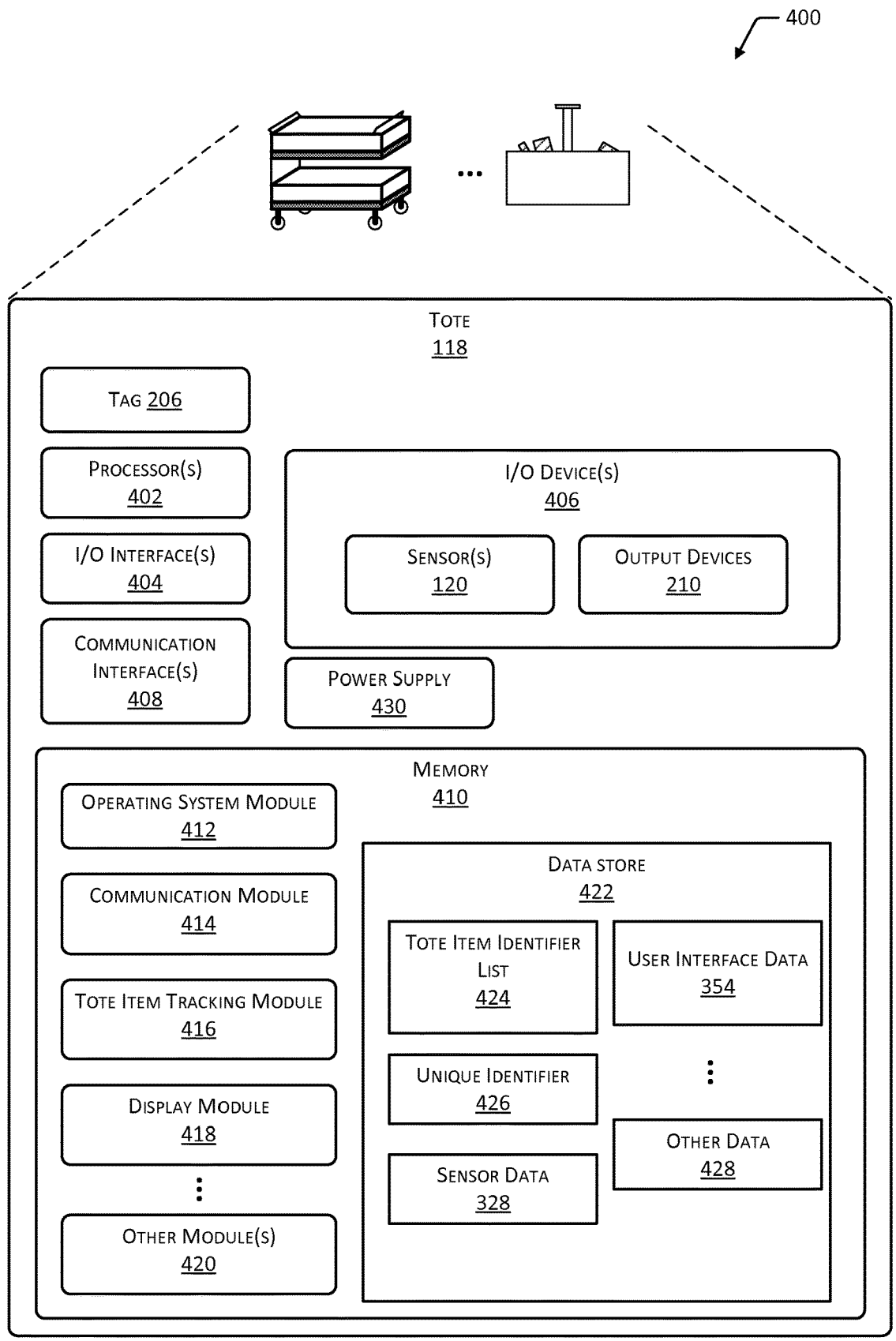
FIG. 4 illustrates a block diagram of a tote, according to some implementations.

FIG. 4 illustrates a block diagram 400 of the tote 118, according to some implementations. The tote 118 may include a tag 206. The tag 206 may be affixed to, integral with, or otherwise associated with the tote 118. In some implementations, the tote 118 may have identifiers, tags 206, or other indicia thereupon. For example, a machine-readable optical code, such as a barcode, may be affixed to a side of the tote 118.

The tote 118 may include one or more hardware processors 402 (processors) configured to execute one or more stored instructions. The processors 402 may comprise one or more cores. The tote 118 may include one or more I/O interface(s) 404 to allow the processor 402 or other portions of the tote 118 to communicate with other devices. The I/O interfaces 404 may include I2C, SPI, USB, RS-232, and so forth.

The I/O interface(s) 404 may couple to one or more I/O devices 406. The I/O devices 406 may include one or more of the input devices such as the sensors 120. As described above, the sensors 120 may include imaging sensors 120(1), weight sensors 120(6), RFID readers 120(8), and so forth. The I/O devices 406 may also include output devices 210 such as haptic output devices 210(1), audio output devices 210(2), display output devices 210(3), and so forth. For example, the tote 118 may include other output devices 210(T) such as lights that may be activated to provide information to the user 116. In some implementations, I/O devices 406 may be combined. For example, a touchscreen display may incorporate a touch sensor 120(4) and a display output device 210(3). In some embodiments, the I/O devices 406 may be physically incorporated with the tote 118 or may be externally placed.

The tote 118 may also include one or more communication interfaces 408. The communication interfaces 408 may be configured to provide communications between the tote 118 and other devices, such as other totes 118, routers, access points 212, servers 204, and so forth. The communication interfaces 408 may include devices configured to couple to PANs, LANs, WANs, and so forth. For example, the communication interfaces 408 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 4, the tote 118 includes one or more memories 410. The memory 410 comprises one or more CRSM as described above. The memory 410 provides storage of computer readable instructions, data structures, program modules, and other data for the operation of the tote 118. A few example functional modules are shown stored in the memory 410, although the same functionality may alternatively be implemented in hardware, firmware, or as a SOC.

The memory 410 may include at least one OS module 412. The OS module 412 is configured to manage hardware resource devices such as the I/O interfaces 404, the I/O devices 406, the communication interfaces 408, and provide various services to applications or modules executing on the processors 402. The OS module 412 may implement a variant of the FreeBSD operating system as promulgated by the FreeBSD Project; other UNIX or UNIX-like variants; a variation of the Linux operating system, such as Android as promulgated by Google, Inc. of Mountain View, Calif., USA; and so forth. Other OS modules 412 may be used, such as the Windows operating system from Microsoft Corporation of Redmond, Wash., USA; the LynxOS from LynuxWorks of San Jose, Calif., USA; and so forth.

Also stored in the memory 410 may be one or more of the following modules. These modules may be executed as foreground applications, background tasks, daemons, and so forth.

A communication module 414 may be configured to establish communications with one or more of the sensors 120, other totes 118, the servers 204, or other devices. The communications may be authenticated, encrypted, and so forth.

The memory 410 may also store a tote item tracking module 416. The tote item tracking module 416 may be configured to maintain a list of items 104, which are associated with the tote 118. For example, the tote item tracking module 416 may receive input from a user 116 by way of a touch screen display with which the user 116 may enter information indicative of the item 104 placed in the tote 118. In another example, the tote item tracking module 416 may receive input from the I/O devices 406, such as the weight sensor 120(6) and an RFID reader 120(8). The tote item tracking module 416 may send the list of items 104 to the inventory management system 122. The tote item tracking module 416 may also be configured to receive information from the inventory management system 122. For example, a list of items 104 to be picked may be presented within a user interface on the display output device 210(3) of the tote 118.

The memory 410 may include a display module 418. The display module 418 may be configured to present information, such as information received from the one or more servers 204 or generated onboard the tote 118, using one or more of the output devices 210. For example, the display module 418 may be configured to receive user interface data 354 provided by the user interface module 322. By processing user interface data 354, the user interface may be presented to the user 116 by way of the output devices 210 of the tote 118. For example, the user interface may include haptic output from the haptic output device 210(1), audio output from the audio output devices 210(2), images presented on the display output devices 210(3), activation of lights or other output from the other output devices 210(T), or a combination thereof.

Other modules 420 may also be stored within the memory 410. In one implementation, a data handler module may be configured to generate sensor data 328. For example, an imaging sensor 120(1) onboard the tote 118 may acquire image data 328(1) and one or more microphones 120(5) onboard the tote 118 may acquire audio data. The sensor data 328, or information based thereon, may be provided to the data acquisition module 318.

The other modules 420 may also include a user authentication module that may be configured to receive input and authenticate or identify a particular user 116. For example, the user 116 may enter a personal identification number (PIN) or may provide a fingerprint to the fingerprint reader to establish identity.

The memory 410 may also include a data store 422 to store information. The data store 422 may use a flat file, database, linked list, tree, executable code, script, or other data structure to store the information. In some implementations, the data store 422 or a portion of the data store 422 may be distributed across one or more other devices including the servers 204, other totes 118, network attached storage devices, and so forth.

The data store 422 may store a tote item identifier list 424. The tote item identifier list 424 may comprise data indicating one or more items 104 associated with the tote 118. For example, the tote item identifier list 424 may indicate the items 104 that are present in the tote 118. The tote item tracking module 416 may generate or otherwise maintain a tote item identifier list 424.

A unique identifier 426 may also be stored in the memory 410. In some implementations, the unique identifier 426 may be stored in rewritable memory, write-once-read-only memory, and so forth. For example, the unique identifier 426 may be burned into a one-time programmable non-volatile memory, such as a programmable read-only memory (PROM). In some implementations, the unique identifier 426 may be part of a communication interface 408. For example, the unique identifier 426 may comprise a media access control (MAC) address associated with a Bluetooth interface. In some implementations, the user interface module 322 may use the unique identifier 426 to determine which tote 118 to generate the user interface upon. In other implementations, the user interface module 322 may use the unique identifier 426 to determine a source for the sensor data 328.

The unique identifier 426 may also be used by the force control module 320 to generate force configuration data 132. Instead of or in addition to tracking the user 116, the inventory management module 316 may generate location data 336 for the tote 118. Based at least in part on the location of the tote 118 in the facility 102 or relative to the user 116, the force configuration data 132 may be generated. For example, the force 126 applied by the force mechanism 124 at the inventory location 114 may be based on the location of the tote 118 in the facility 102.

The data store 422 may also store sensor data 328. The sensor data 328 may be acquired from the sensors 120 onboard the tote 118. The user interface data 354 received by the tote 118 may also be stored in the data store 422.

Other data 428 may also be stored within the data store 422. For example, tote configuration settings, user interface preferences, and so forth, may also be stored within the data store 422.

The tote 118 may also include a power supply 430. The power supply 430 is configured to provide electrical power suitable for operating the components in the tote 118. The power supply 430 may comprise one or more of photovoltaic cells, batteries, wireless power receivers, fuel cells, capacitors, and so forth.

Figure 5:
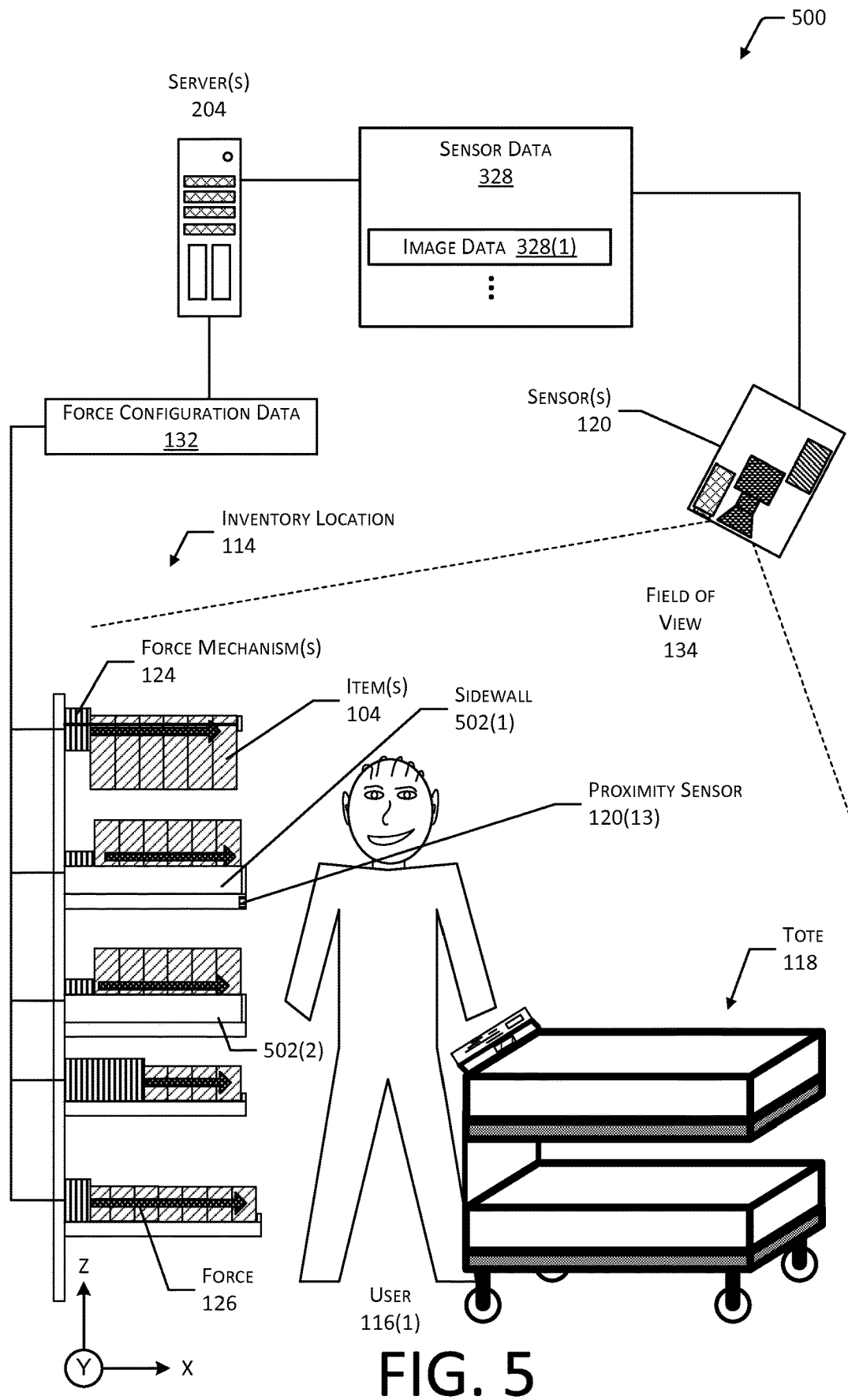
FIG. 5 illustrates an overhead imaging sensor configured to acquire sensor data in the facility while the user interacts with auto-facing inventory locations, according to some implementations.

FIG. 5 illustrates a side view 500 of an overhead imaging sensor 120(1) acquiring an image of the users 116, the tote 118, and other objects. In some implementations, the facility 102 may include one or more sensors 120 that are configured to acquire data from an overhead vantage point or at other locations within the facility 102, such as on the inventory locations 114. The sensors 120 may include, but are not limited to, one or more of the imaging sensors 120(1), the 3D sensors 120(2), the microphones 120(5), the RFID readers 120(8), the RF receivers 120(9), the proximity sensors 120(13), and so forth. The sensor data 328 acquired by the sensors 120 may be used to generate the user context data 130.

In this illustration, one of the sensors 120 comprises an imaging sensor that is configured to generate image data 328(1). A FOV 134 of the imaging sensor 120(1) depicted here includes a rack of several inventory locations 114, the user 116, and the tote 118. The image data 328(1) may be provided to the server 204. In some implementations, one or more of the inventory locations 114 may include proximity sensors 120(13). For example, the proximity sensor 120(13) may be mounted on a front of an inventory location 114. The front of the inventory location 114 may comprise a portion of the inventory location 114 that is proximate to the user 116 during typical use, such as the portion directed toward the aisle 112.

In some implementations, the data acquisition module 318 may be configured to generate user context data 130 using information from the plurality of sensors 120. For example, the image data 328(1) may be processed by the inventory management module 316 to determine at least a portion of the user context data 130, such as the location data 336 for the users 116, gesture of the user 116, identity of the user 116, and so forth. For example, the inventory management module 316 may determine, based on the image data 328(1) that the user 116 is reaching towards the inventory location 114.

The server 204 accesses the sensor data 328 and the force control module 320 generates force configuration data 132 for one or more of the force mechanisms 124 associated with the inventory locations 114. For example, as depicted here by way of the thickness of the arrow, based on the user context data 130, the force 126 applied by the force mechanisms 124 of the inventory locations 114 may be set at a relatively low level. This relatively low level of force 126 may facilitate removal of an item 104 from the inventory locations 114. The force mechanisms 124 are described in more detail below with regard to FIGS. 8 and 9.

The inventory locations 114 may have one or more sidewalls 502. The sidewall 502 may be configured to provide a lateral constraint to the items 104 at the inventory location 114. For example, the sidewalls 502 may comprise solid surfaces, rods, mesh, or other features that maintain the items 104 in a column. In some implementations the sidewalls 502 may come into contact with the items 104.

As described above, the tote 118 may also include one or more output devices 210, one or more sensors 120, and so forth. The data acquisition module 318 may be configured to access the data provided by these sensors 120 while the user interface module 322 may be configured to generate user interface data 354 configured to provide the user interface by way of the output devices 210. The user interface may be used to acquire information from the user 116 such as user preferences 350 for preferred force 126.

Figure 6:
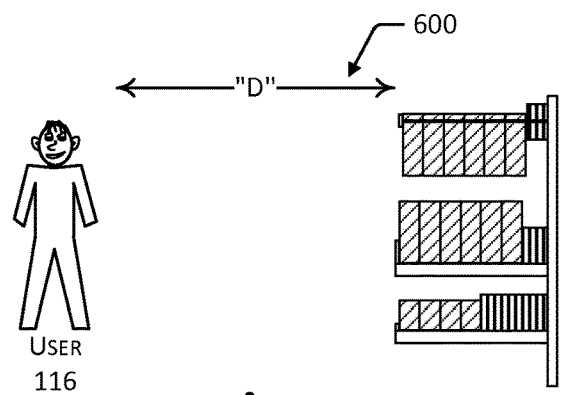
FIG. 6 illustrates setting of force applied by a force mechanism to items at an inventory location based on a distance between the user and the inventory location, according to some implementations.
Figure 6:
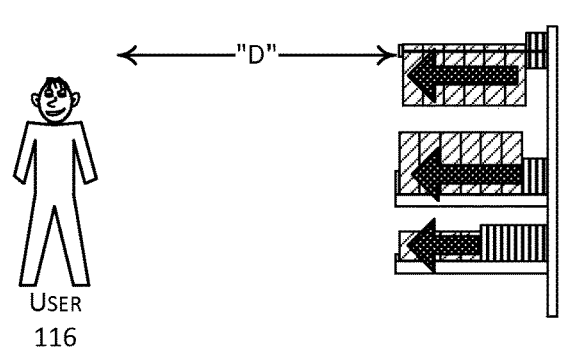
Figure 6:
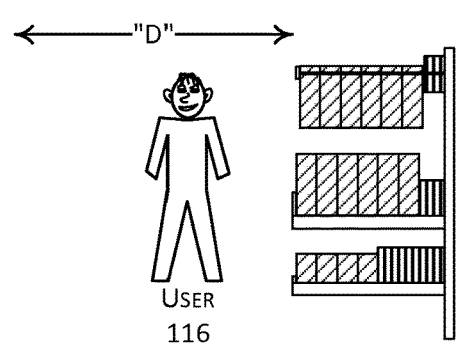
Figure 6:
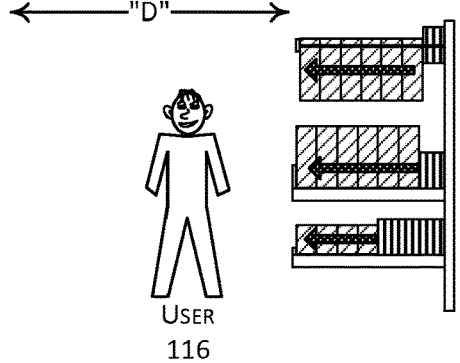

FIG. 6 illustrates operation 600 of setting force 126 applied by a force mechanism 124 to one or more items 104 at an inventory location 114 based on a distance between the user 116 and the inventory location 114, according to some implementations.

As described above, in some implementations, the user context data 130 may include proximity data 338 indicative of a distance between the inventory location 114 and the user 116. A threshold distance "D" may be specified such that when the user 116 is within the threshold distance a first force 126(1) is configured to be applied by the force mechanism 124 at an inventory location 114. For example, the threshold distance "D" may be expressed as a distance from a particular point on the inventory location 114 and describe an arc. The magnitude of the force 126 as applied is indicated in these figures by the relative thickness of the arrows. When the user 116 is beyond the threshold distance, a second force 126(2) is configured to be applied by the force mechanism 124 at the inventory location 114.

At 602, the force control module 320 (not shown) may determine no user 116 is within the threshold distance "D" of the inventory location 114. For example, the force control module 320 may generate or access the proximity data 338 indicative of the distance between the user 116 and the inventory location 114. The proximity data 338 may be based at least in part on the image data 328(1) or on other sensor data 328 such as acquired by one or more of the proximity sensors 120(13).

At 604, the force control module 320 generates force configuration data 132(1). The force configuration data 132(1) is configured to direct the force mechanism 124 to apply a first level or magnitude of force 126(1) to one or more of the items 104 stowed at an associated inventory location 114. The force configuration data 132(1) may be provided to the force mechanism 124, which may then exert the first level of force 126(1) to the items 104 at the inventory location 114. For example, the force configure data 132(1) may be sent using a network 202 to a controller coupled to the actuator 214 of the force mechanism 124.

For example, the first level of force 126(1) may be configured to shift or displace one or more of the items 104 such that the inventory location 114 is faced. The first level force 126(1) may be sufficient to overcome static friction between the bottom of the items 104 and the surface of the inventory location 114 upon which items 104 rest and displace the items 104. Responsive to the first level of force 126(1), the one or more items 104 present at the inventory location 114 are faced or physically displaced such that the items 104 are neatly arranged at a particular location on the inventory location 114, such as along a front of the inventory location 114.

The first level force 126(1) may be static or dynamic. For example, the static level of force 126 may be manually set or determined from experimentation. In another example, the dynamic level of force 126 may be based on information such as a quantity of the items 104 present at the inventory location 114, the weight of the items 114, composition of the packaging of the items 104, and so forth. For example, the first level force 126(1) may be greater when the inventory location 114 is full of heavy items 104 as compared to when the inventory location 114 is almost empty.

At 606, the user 116 is determined to be within a threshold distance "D" of the inventory location 114. As described above, the force control module 320 may generate or access the proximity data 338 indicative of the distance between the user 116 and the inventory location 114 at a later time. The proximity data 338 may be based on the physical layout data 330, the location data 336, and so forth.

At 608, the force control module 320 generates second force configuration data 132(2). The second force configuration data 132(2) is configured to direct the force mechanism 124 to apply a second level or magnitude of force 126(2) to one or more of the items 104 located in the associated inventory location 114. In some implementations, the second level of force 126(2) may be less than the first level of force 126(1). For example, now that the user 116 is proximate to the inventory location 114, the force mechanism 124 applies a lesser force 126(2) (indicated by the narrower arrow) allowing the user 116 to more easily add or remove items 104 from the inventory location 114.

Figure 7:
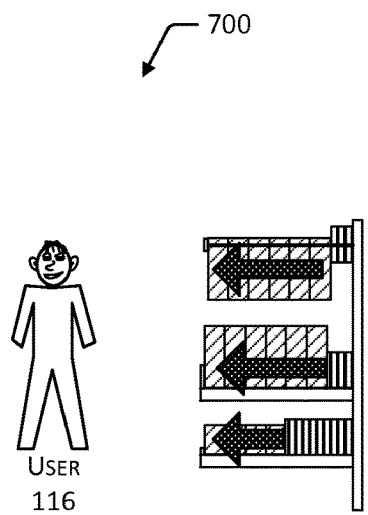
FIG. 7 illustrates setting of force applied by a force mechanism to items at an inventory location based on a gesture of the user, according to some implementations.
Figure 7:
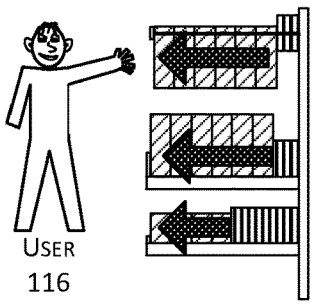
Figure 7:
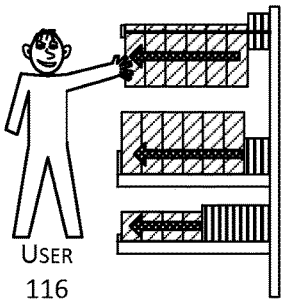

FIG. 7 illustrates operation 700 of setting force 126 applied by a force mechanism 124 to items 104 at an inventory location 114 based on a gesture of the user 116, according to some implementations.

As described above, in some implementations, user context data 130 may include pose data 340 or other information indicative of a gesture made by the user 116. For example, the gesture may comprise one or more of user 116 reaching a hand towards the inventory location 114, pointing at the inventory location 114, facing the inventory location 114, or looking at the inventory location 114.

At 702, the force control module 320 (not shown) generates force configuration data 132(1). The force configuration data 132(1) is configured to direct the force mechanism 124 to apply a first level or magnitude of force 126(1) to one or more of the items 104 stowed at an associated inventory location 114. For example, the first level of force 126(1) may be sufficient to displace one or more of the items 104 such that the inventory location 114 is faced.

At 704, the force control module 320 determines or accesses information indicative of a gesture associated with the inventory location 114 as made by the user 116. For example, the inventory management module 316 may process image data 328(1) to determine a pose or configuration of the hand of the user 116 reaching towards the inventory location 114. In some implementations the force control module 320 may consider other input, such as whether the user 116 is within a threshold distance "D" of the inventory location 114.

At 706, the force control module 320 generates second force configuration data 132(2). The second force configuration data 132(2) is configured to direct the force mechanism 124 to apply a second level or magnitude of force 126(2) to one or more of the items 104 located in the associated inventory location 114. In some implementations, the second level of force 126(2) may be less than the first level of force 126(1). For example, now that the user 116 is reaching towards the inventory location 114, the force mechanism 124 applies a lesser force 126(2) allowing the user 116 to more easily add or remove items 104 from the inventory location 114.

In some implementations, the level of force 126 applied may be based at least in part on whether the user 116 is holding one or more items 104. For example, while performing a restocking operation the user 116 may be holding several items 104 in their hands. Continuing the example, the second force configuration data 132(2) may be configured to direct the force mechanism 124 to apply a least possible or lowest level of force 126 that the force mechanism 124 is capable of attaining. Such a reduction or elimination in the force 126 may allow the user 116 to easily restock the inventory location 114.

Figure 8:
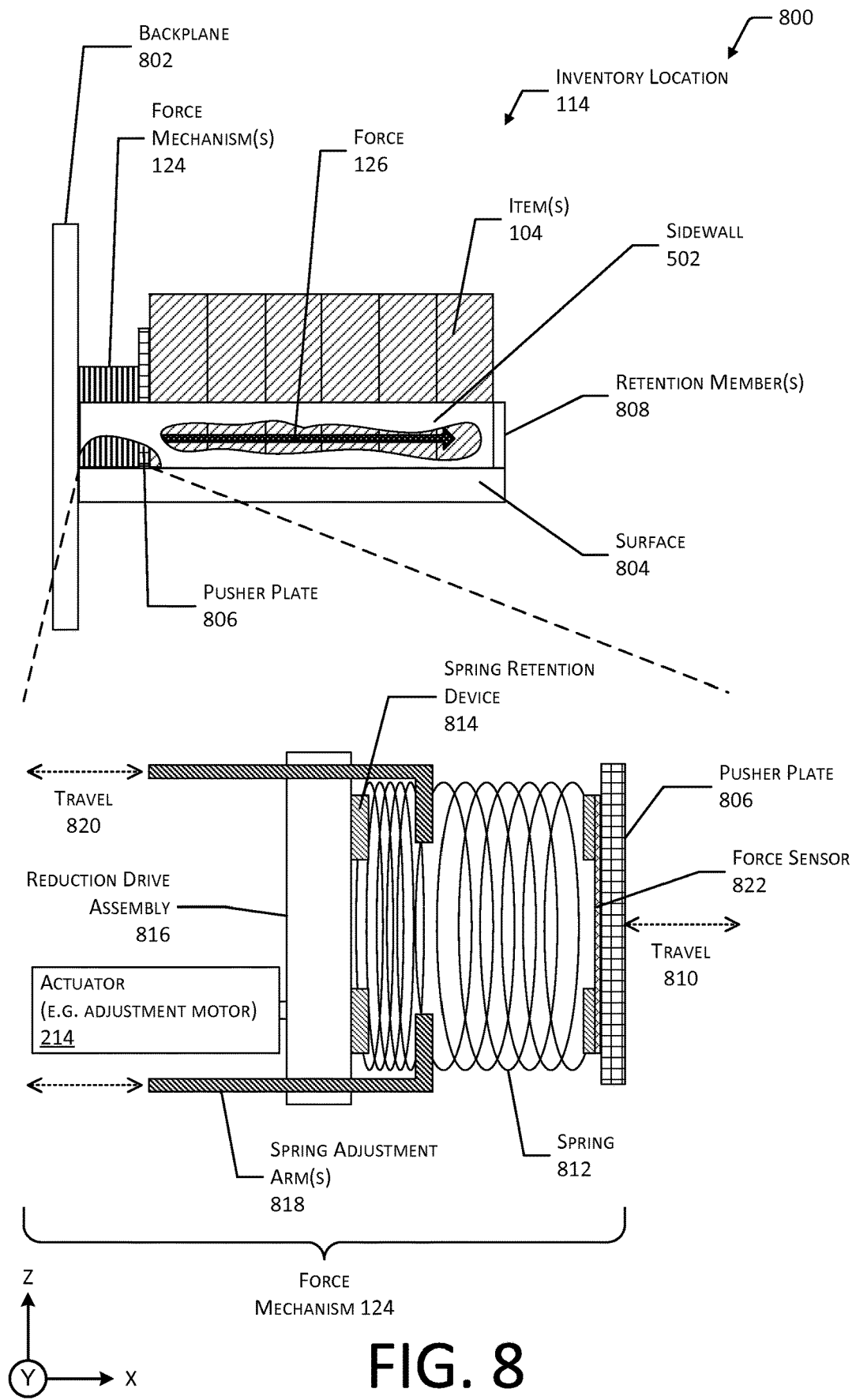
FIG. 8 illustrates a force mechanism comprising a spring and a spring adjustment mechanism configurable to exert different levels of force to items at an inventory location, according to some implementations.
Figure 9:
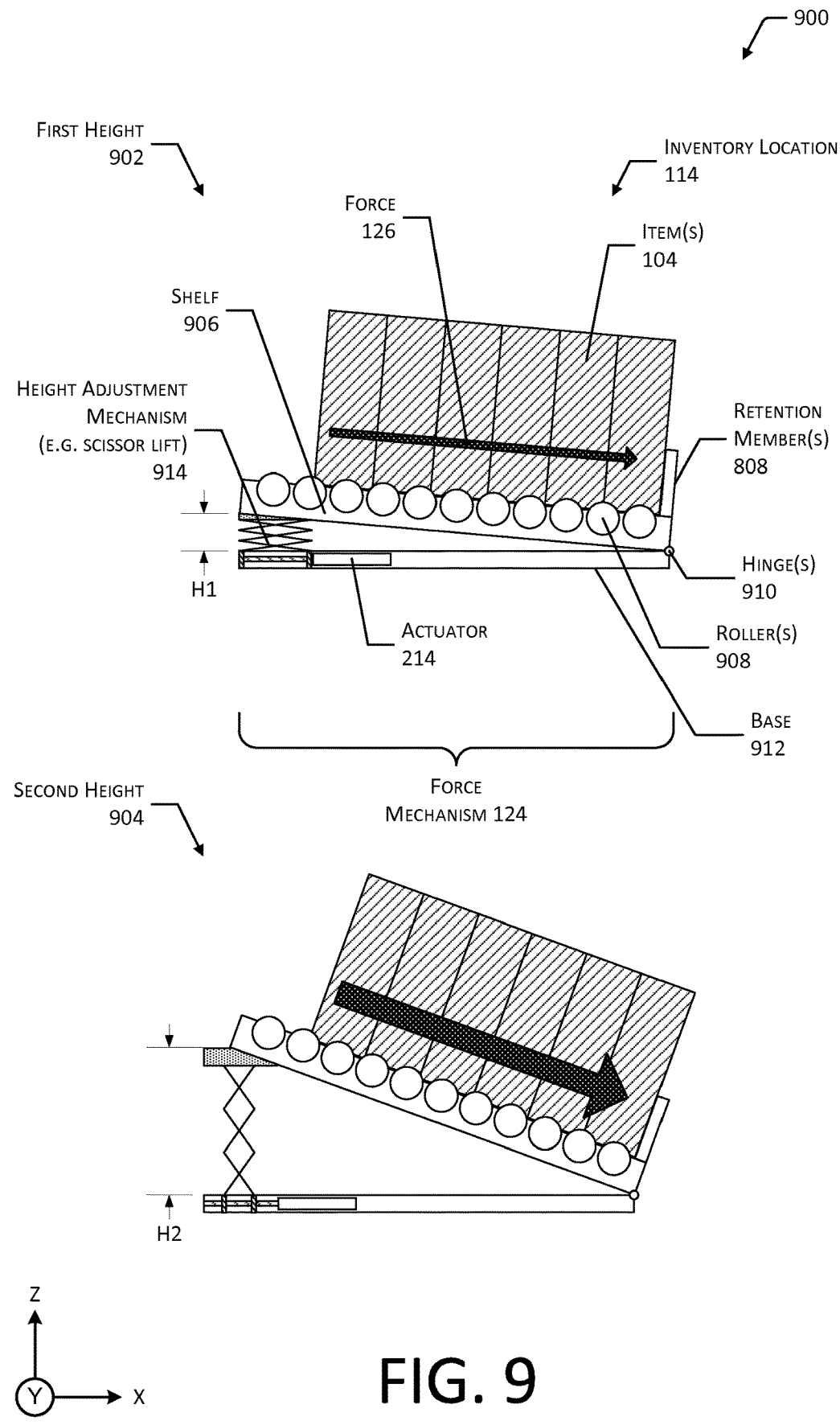
FIG. 9 illustrates a force mechanism comprising a tilting shelf and a height adjustment mechanism configurable to change an angle of the shelf such that different levels of force are applied to items at an inventory location, according to some implementations.

A number of different force mechanisms 124 may be used by the facility 102. In some implementations, the same type of force mechanism 124 may be used throughout the facility 102, while in other implementations, different force mechanisms 124 may be employed simultaneously within the same facility 102. The force mechanisms 124 described below with regard to FIGS. 8 and 9 are provided as illustrations, and not necessarily as limitations. In other implementations, other types of force mechanisms 124 may be used to impart a force 126 on one or more items 104 at an inventory location 114.

FIG. 8 illustrates an implementation 800 of a force mechanism 124 comprising a spring and a spring adjustment mechanism configurable to exert different levels of force 126 to items 104 at an inventory location 114.

The inventory location 114 may comprise a backplane 802. The backplane 802 may comprise one or more structures configured to provide mechanical support to a surface 804. The items 104 are configured to rest or be supported by the surface 804. In another implementation not depicted, instead of the surface 804, the items 104 may be suspended from a board, peg, or other elongated member. In some implementations, a weight sensor 120(6) may be incorporated into the surface 804 or otherwise configured to weigh the one or more items 104 resting on the surface 804.

A force mechanism 124 is configured to displace a pusher plate 806. The pusher plate 806 in turn is configured to come into physical contact with one or more of the items 104. As the force mechanism 124 exerts the force 126 on the pusher plate 806, the pusher plate 806 in turn directs the force 126 to the one or more items 104 stowed at the inventory location 114. One or more retention members 808 are configured to prevent spillage of the one or more items 104 from the front of the inventory location 114. For example, the retention member 808 may comprise a lip or ridge. In some implementations, the one or more retention members 808 may be omitted, and instead the force mechanism 124 may be configured to displace the items 104 to the front of the surface 804 without pushing the items 104 off of the edge. For example, image data 328(1) may be used to provide feedback to the force mechanism 124 indicating when the items 104 have been properly faced, and thus the force 126 used to displace the one or more items 104 at the inventory location 114 may be discontinued.

The inventory location 114 depicted here includes a sidewall 502 with a cutaway to show interior features. The sidewall 502 may be separate from, or integrated with the retention member(s) 808.

An enlargement of the force mechanism 124 is depicted as well in FIG. 8. The force mechanism 124 may be configured to displace the pusher plate 806 along a direction of travel 810. One or more springs 812 may be coupled to the pusher plate 806. The springs 812 may comprise volute springs, helical springs, coil springs, compression springs, tension springs, constant force springs, conical springs, and so forth. For example, constant force springs may comprise a rolled or coiled ribbon of spring steel. In the implementation depicted in FIG. 8, the spring 812 comprises a helical compression spring.

One or more spring retention devices 814 may be configured to mechanically couple the spring 812 to the pusher plate 806. One or more spring retention devices 814 may also be configured to mechanically couple the spring to another structure within the force mechanism 124 such as a housing or other portion of a reduction drive assembly 816. In one implementation, the spring retention devices 814 may comprise clips, latches, brackets, adhesives, or other structures.

One or more spring adjustment arms 818 may be configured to selectively restrain at least a portion of the spring 812. For example, the spring adjustment arm 818 may comprise two or more arms or other elements configured to mechanically engage and displace a portion of the spring 812. The spring adjustment arms 818 may be mechanically coupled to the reduction drive assembly 816. The reduction drive assembly 816 may comprise one or more gears configured to accept rotary motion from an actuator 214 (such as an adjustment motor) and in turn causes displacement of one or more of the spring adjustment arms 818. For example, the rotary motion of the actuator 214 may cause the spring adjustment arms 818 to move along a direction of travel 820 such that the spring adjustment arms 818 engage more or less of the spring 812. By controlling motion of the actuator 214, such as in response to force configuration data 132 or another signal as provided by the force control module 320, the force 126 exerted by the spring 812 upon the pusher plate 806 may be varied. For example, as more of the spring 812 is retained by the spring retention device 814 and compressed, the remaining spring 812 applies less force 126 on the pusher plate 806. In some implementations, retention of a significant portion of the spring 812 may cause the pusher plate 806 to retract. The retraction may cause the pusher plate 806 to recede from the front of the inventory location.

The structure and operation of the actuator 214, spring retention device 814, and so forth may vary depending upon the type of spring 812 used. For example, where the spring 812 comprises a constant force spring having a coil of spring steel, the force mechanism 124 may use the actuator to rotate the coil, move an arm around a circumference of the coil, and so forth.

In other implementations not depicted here, the actuator 214 may directly engage the pusher plate 806. For example, the actuator 214 may comprise a linear motor 214(1) that is mechanically coupled directly to the pusher plate 806.

In some implementations, the force mechanism 124 may include or may be configured to operate in conjunction with a force sensor 822. The force sensor 822 is configured to provide data indicative of an amount of applied force 126 or pressure. For example, the force sensor 822 may comprise a load cell or strain gauge configured to provide data indicative of a magnitude of an applied force 126. In some implementations, the force sensor 822 may implement the same or similar technologies to those described above with regard to the weight sensor 120(6). The force sensor 822 may be mounted on a back side of the pusher plate 806 as depicted here at the interface between the spring 812 and the pusher plate 806. In other implementations, the force sensor 822 may be arranged in other portions of the force mechanism 124. For example, the force sensor 822 may be arranged on a face of the pusher plate 806, at the spring retention devices 814 on the reduction drive assemblies 816, and so forth.

The force mechanism 124 may include, or be coupled to, a microcontroller configured to drive the actuator 214 until a predetermined amount of force 126 measured by the force sensor 822 is determined. The force sensor 822 may just be used to provide feedback as to operation of the force mechanism 124. The force sensor 822 may also provide other information such as an amount of force 126 determined to be necessary to displace one or more of the items 104 at the inventory location 114. For example, one or more imaging sensors 120(1) having a FOV 134 including the inventory location 114 may be configured to acquire image data 328(1) while increasing levels of force 126 are applied by the force mechanism 124 to the one or more items 104. Based on the amount of force 126 indicated by the force sensor 822 and image data 328(1) indicating that one or more of the items 104 have moved, the force control module 320 may determine the amount of force 126 necessary to move the items 104 without human intervention.

FIG. 9 illustrates an implementation 900 of a force mechanism 124 comprising an inventory location 114 having a tilting shelf and a height adjustment mechanism configurable to change an angle of the shelf. Different levels of force 126 are applied to items 104 at the inventory location 114, depending upon the angle of the tilt.

Depicted in this illustration is an inventory location 114 having a portion thereof at a first height 902 and a second height 904. In this implementation, the force 126 is produced as a result of the weight of the items 104 themselves, as opposed to a force imposed by one or more of the actuators 214. The one or more items 104 may rest upon a tray or shelf 906. A retention member 808 may be configured to prevent the items 104 from falling from the shelf 906. In some implementations one or more sidewalls 502 may also be present to provide lateral constraint to the items 104. The shelf 906 and the force mechanism 124 may be configured to allow for rear stocking of the shelf 906. For example, a user 116 placing stock on the shelf 906 may be able to insert items 104 at the back or behind the existing items 104. In some implementations, the shelf 906 may comprise one or more rollers 908. The rollers 908 may be configured to facilitate motion of the one or more items 104 along the shelf 906. In other implementations, the shelf 906 may comprise or be coated with a material to facilitate movement of the items 104, such as polytetrafluoroethylene (PTFE). The shelf 906 may be coupled using one or more hinges 910 or other mechanisms to a base 912. In the implementation depicted in FIG. 9, the hinge 910 is depicted at a front of the inventory location 114. In other implementations, the hinge 910 or an equivalent structure may be positioned elsewhere with respect to the shelf 906. For example, the hinge 910 may be located at a midpoint between the front and the back of the shelf 906.

The shelf 906 is configured to pivot about the hinge 910 such that the shelf 906 may be positioned at different angles relative to the base 912 or another horizontal reference, such as the floor of the facility 102. A height adjustment mechanism 914 is configured to change a height of at least a portion of the shelf 906. As a result of the change in height, the shelf 906 may be tilted at different angles relative to the base 912. In the implementation depicted here, the height adjustment mechanism 914 may comprise a scissor lift. In other implementations, other mechanisms such as threaded rods, gears, pneumatic balloons, ladders, and so forth, may be used to change the height of the shelf 906. The height adjustment mechanism 914 may be driven by one or more actuators 214. Operation of the actuator 214 may be directed by or based at least in part on the force configuration data 132.

A first height 902 of H1 of a back of the shelf 906 as depicted at 902 is less than a height H2 as depicted at 904. While tilted at height H1, the relatively small angle of tilt produces a relatively small force 126. In comparison, the greater tilt produced by the greater height 904 of H2 results in a larger force 126. For example, the first height 902 may be used for picking by the user 116, while the second height 904 may be used to facilitate one or more of facing the items 104, stocking of the shelf 906 from the rear, and so forth.

Illustrative Processes

Figure 10:
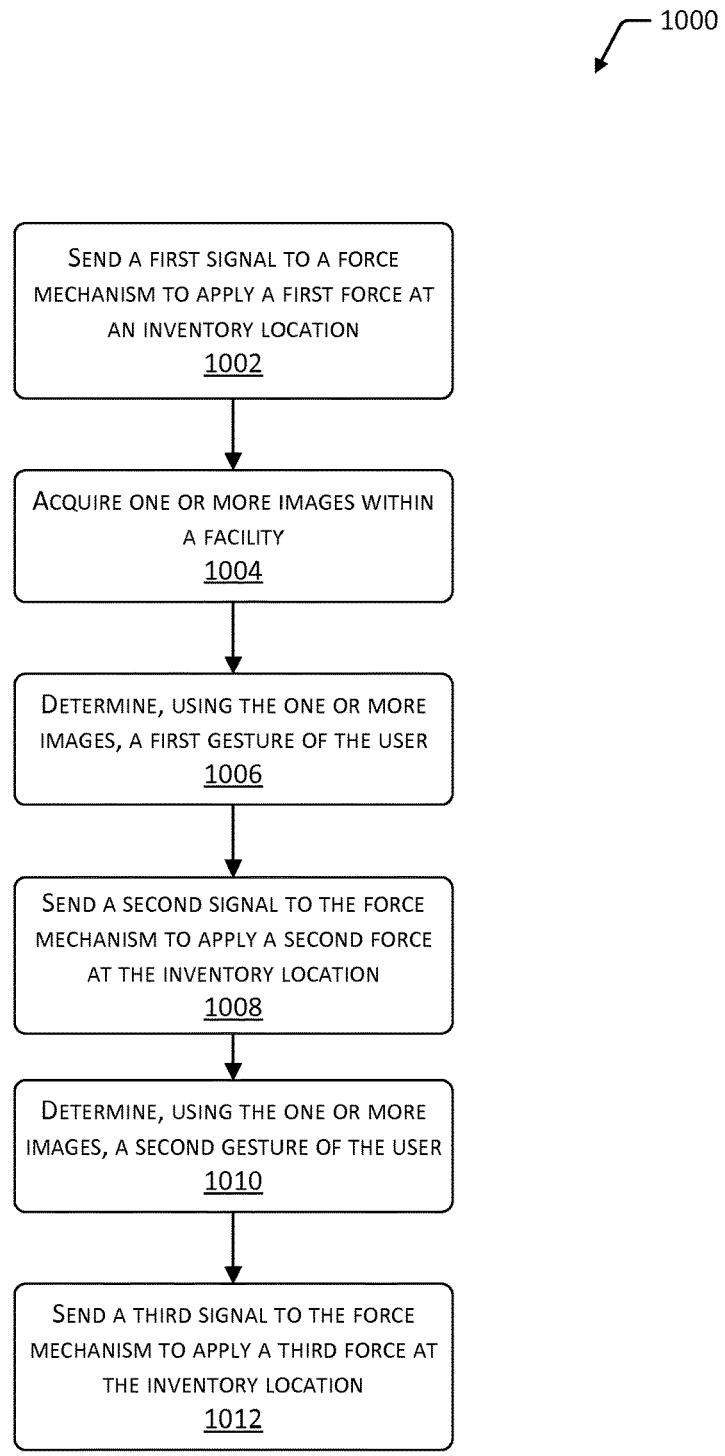
FIG. 10 depicts a flow diagram of a process for controlling the force applied to items at an inventory location based on data acquired from one or more images, according to some implementations.

FIG. 10 depicts a flow diagram 1000 of a process for controlling the force 126 applied to items 104 at an inventory location 114 based on data acquired from one or more images, according to some implementations. In some implementations, the process may be performed at least in part by the inventory management module 316.

Block 1002 sends first force configuration data 132(1) as a first signal to the force mechanism 124. The first force configuration data 132(1) is configured to direct the force mechanism 124 to apply a first force 126(1) to the one or more items 104 at the inventory location 114. For example, the first signal may be configured to drive the actuator 214 to a predetermined position.

Block 1004 acquires one or more images within the facility 102. For example, the imaging sensors 120(1) such as cameras may acquire image data 328(1).

Block 1006 determines using one or more of the images, a first gesture of the user 116. For example, the inventory management module 316 may use one or more image processing techniques to process the image data 328(1) and determine the first gesture of the user 116. Continuing the example, the image processing techniques may use a cascade classifier configured to determine that the image data 328(1) comprises an image of an open hand of the user 116 moving towards the inventory location 114.

In another example, the first gesture may comprise a hand of the user 116 holding one or more items 104. For example, the user 116 may be restocking the inventory location 114.

Block 1008 sends second force configuration data 132(2) as a second signal to the force mechanism 124. The second force configuration data 132(2) is configured to direct the force mechanism 124 to apply a second force 126(2) to the one or more items 104 at the inventory location 114. In some implementations, the second force 126(2) may be less than the first force 126(1). Continuing the example with regard to restocking the inventory location 114, the second force 126(2) may be insufficient to push the plurality of items 104 to the front of the inventory location 114.

Block 1010 determines, using the one or more images, a second gesture of the user 116. For example, the inventory management module 316 may use the one or more image processing techniques to process the image data 328(1) and determine the second gesture. Continuing the restocking example, the imaging processing techniques may determine that the image data 328(1) comprises an image of the hand of the user 116 moving away from the inventory location 114.

Block 1012 sends a third force configuration data 132(3) to the force mechanism 124. The third force configuration data 132(3) is configured to direct the force mechanism 124 to apply the first force 126(1) to the one or more items 104 at the inventory location 114. Continuing the example above involving the empty hand of the user 116, now that the user 116 is moving their hand away from the inventory location 114, the greater force 126(1) may be applied to face the items 104 remaining in the inventory location 114. In other implementations, the third force configuration data 132(3) may direct applying a level of force 126 different from that of the first force 126(1).

Figure 11:
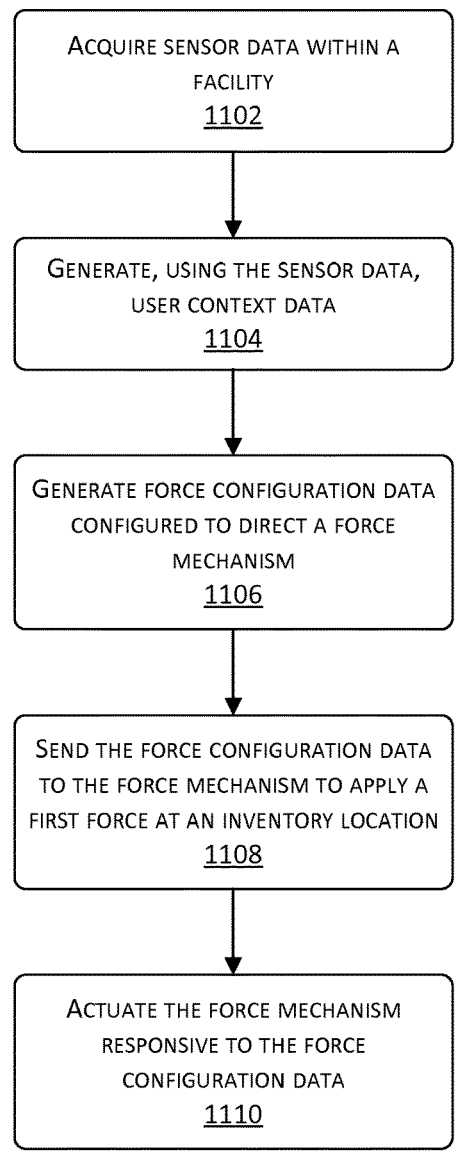
FIG. 11 depicts a flow diagram of a process for controlling the force applied to items at an inventory location based on sensor data, according to some implementations.

FIG. 11 depicts a flow diagram 1100 of a process for controlling the force 126 applied to items 104 at an inventory location 114 based on sensor data 328, according to some implementations. In some implementations, the process may be performed at least in part by the inventory management module 316.

Block 1102 acquires sensor data 328 from the one or more sensors 120 associated with the facility 102. For example, the imaging sensors 120(1) may generate image data 328(1), proximity sensors 120(13) may generate data indicative of proximity of an object such as the user 116, and so forth. In another example, the weight sensors 120(6) distributed in the floor at particular locations in the facility 102 may gather weight data.

Block 1104 generates, using the sensor data 328, user context data 130. The user context data 130 may be indicative of a user interaction 136 by the user 116 with the inventory location 114. For example, as described above, the inventory management module 316 may generate data such as user context data 130 based on the sensor data 328. In one implementation, the user context data 130 may be based on the image data 328(1). For example, the location data 336, proximity data 338, pose data 340, and so forth, may be based at least in part on image processing of the image data 328(1).

In one implementation, the user context data 130 may include information indicative of one or more of the user 116 reaching towards the one or more items 104 stowed at the inventory location 114, proximity of the user 116 to the inventory location 114, historical activity of the user 116, location of the user 116 within the facility 102, and so forth. The user context data 130 may further include one or more of identity of the user 116, pose of the user's 116 hand, pose of the user's 116 body, and so forth.

In one implementation, the user context data 130 may include the predicted path 342. As described above, the predicted path 342 may be an estimation of which route through the facility 102 the user 116 may take. The predicted path 342 may also be one or more possible routes of the user 116 within the facility 102. The predicted path 342 may be used in conjunction with physical layout data 330 or other user context data 130 to determine that at least a portion of the predicted path 342 of the user 116 is within a threshold distance of the inventory location 114. For example, the predicted path 342 will take the user 116 down the aisle 112(1), then aisle 112(5), and past the inventory locations 114 therein. The user interaction 136 may comprise the expected passage of the user 116 within the threshold distance of the inventory location 114 along the predicted path 342.

In some implementations, the user context data 130 may comprise information about expected arrival of the user 116 proximate to the inventory location 114. A block (not shown) may determine an actuation time indicative of an amount of time for the force mechanism 124 to transition between force levels 126, such as from a first force level 126(1) to a second force level 126(2). For example, the actuator 214 may require some time to change the amount of force 126 provided by the force mechanism 124 when responding to the force configuration data 132.

A block may calculate a trigger time to activate the force mechanism 124 based on the expected arrival time and the actuation time. For example, the expected arrival time of the user 116 at the inventory location 114 may be 15:03 and the actuation time may be 1 minute to transition from a first force level to a second force level, resulting in a trigger time of 15:02 for the force mechanism 124. The sending of block 1108, as described below, may be configured to send the force configuration data 132 to the force mechanism 124, or generate force configuration data 132 configured to activate the actuator 214 on or before the trigger time of 15:02.

Block 1106 generates force configuration data 132 configured to direct the force mechanism 124. As described above, the force configuration data 132 may be generated using the user context data 130. For example, force configuration data 132 may be based on the location data 336, the proximity data 338, the pose data 340, predicted path 342, and so forth. Continuing the example from above, force configuration data 132 for the inventory locations 114 and the corresponding force mechanisms 124 along the predicted path 342 may be generated.

A block (not shown) may determine identity of the user 116. The identity may be determined based on one or more of the following: data entered by the user 116, an image acquired using one or more imaging sensors 120(1), biometric data, presence of a tag 206, and so forth. In one implementation, purchase history associated with the identity of the user 116 may be accessed. An item 104 determined to be stored at the inventory location 114 may be indicated as previously having been purchased by the user 116 in the purchase history. Based on this previous purchase history, the force configuration data 132 may be generated to reduce the force 126 such that the user 116 may more easily pick the item 104. In another implementation, based on the identity of the user 116, particular user preferences 350 may be accessed and used to generate the force configuration data 132.

Based at least in part on the user context data 130, block 1108 sends first force configuration data 132(1) as a first signal to the force mechanism 124 to change a first force 126(1) applied to one or more items 104 stowed at an inventory location 114. For example, the first force 126(1) may be application of an increased force or reduction of a previously applied force. As described above, force configuration data 132 may direct operation of the actuator 214 of the force mechanism 124. For example, the adjustment motor may comprise a servomotor configurable to produce a predetermined number of revolutions responsive to the force configuration data 132(1). Continuing the example, the servomotor may include a rotary encoder and control circuitry configurable to produce the predetermined number of revolutions.

In one implementation, the user context data 130 is indicative of a gesture. The gesture may include one or more of the user 116 pointing an implement at the inventory location 114, reaching a hand towards the inventory location 114, opening the hand, using the hand to point at the inventory location 114, looking or gazing at the inventory location 114 or orientating the torso of the body of the user 116 towards the inventory location 114, and so forth. For example, the user 116 may be using tongs to handle items 104, and the gesture may comprise the user 116 reaching towards the inventory location 114 with the tongs, or pointing at the inventory location 114 with the tongs.

As described above, in some implementations, the user context data 130 may include proximity data 338 indicative of a distance between the user 116 and the inventory location 114. The distance may be compared to a threshold distance. Based on whether the distance is greater than, less than, or equal to the threshold distance, different levels of force 126 may be selected and expressed in the force configuration data 132.

In another implementation, the location data 336 of the user 116 may be determined within the facility 102 using the plurality of images. For example, the imaging sensors 120(1) may be used to track and locate the user 116. In one configuration, the user interaction 136 may comprise the location of the user 116 being proximate to the inventory location 114. In another configuration, the user interaction 136 may comprise the location of the user 116 at a particular location, such as "at the entrance to aisle 112(1)", rather than relative proximity to a particular inventory location 114. The user interaction 136 may comprise the location of the user 116 at a particular location, such as "in front of inventory locations 114(4)-(5)".

In still another implementation, the location data 336 of the user 116 may be determined within the facility 102 using the weight data from one or more weight sensors 120(6). For example, the weight sensors 120(6) may be used to track and locate the user 116 in the facility 102. The location data 336 may be generated based at least in part on the weight data. Block 1108 sends force configuration data 132 to the force mechanism 124 to apply a first force 126(1) at an inventory location 114. As described above, in some implementations, force configuration data 132 may be sent on or before occurrence of a trigger time. With this implementation, the force mechanism 124 is able to produce the desired force 126 on or before the arrival of the user 116 at the inventory location 114.

Block 1110 actuates the force mechanism 124 associated with the inventory location 114 responsive to the force configuration data 132. For example, the force mechanism 124 may transition from a first level of force 126(1) as applied to the one or more items 104 stowed at the inventory location 114 to a second level of force 126(2).

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for facing items in a materials handling facility (facility), the system comprising:
   a camera to acquire one or more images within the facility;
   an inventory location holding a plurality of items, the inventory location comprising a force mechanism comprising:
      a pusher plate to come into contact with at least one of the plurality of items; and
      an actuator to produce a force to displace the pusher plate to push the plurality of items to a front of the inventory location;
   a memory, storing computer-executable instructions; and
   a hardware processor in communication with the camera, the force mechanism, and the memory, wherein the hardware processor is configured to execute the computer-executable instructions to:
      send a first signal to the force mechanism to apply a first force to the plurality of items;
      determine, at least in part with a first set of the one or more images, that a hand of a user is moving towards the inventory location; and
      responsive to the determination that the hand of the user is moving towards the inventory location, send a second signal to the force mechanism to apply a second force to the plurality of items held by the inventory location, wherein the second force is less than the first force.

2. The system of claim 1, further comprising computer-executable instructions to:
   determine, at least in part with a second set of the one or more images, that the hand of the user is moving away from the inventory location; and
   send a third signal to the force mechanism to apply the first force to the plurality of items held by the inventory location.

3. The system of claim 1, further comprising computer-executable instructions to:
   determine, at least in part with the first set of the one or more images, that the hand of the user moving towards the inventory location is holding one or more items; and
   wherein the second force is less than a force needed to push the plurality of items to the front of the inventory location or retract the pusher plate away from the front of the inventory location.

4. A system comprising:
   one or more sensors;
   an inventory location comprising a force mechanism, the force mechanism comprising:
      a pusher plate to maintain contact with at least a portion of one or more items; and
      an actuator to produce a force to displace the pusher plate to push the one or more items toward a front of the inventory location;
   a memory, storing computer-executable instructions; and
   a hardware processor in communication with the one or more sensors, the force mechanism, and the memory, wherein the hardware processor is configured to execute the computer-executable instructions to:
      generate user context data indicative of a gesture by a user; and
      based at least in part on the user context data, send a first signal to the force mechanism to modify an amount of force directed to displacing the one or more items towards the front of the inventory location.

5. The system of claim 4, the gesture comprising one or more of:
   the user pointing an implement at the inventory location, the user reaching a hand towards the inventory location, the user opening the hand,
the user using the hand to point at the inventory location, or
the user looking at the inventory location.

6. The system of claim 5, wherein the one or more sensors comprise one or more imaging sensors; and
further comprising computer-executable instructions to:
access one or more images of the user with the one or more imaging sensors; and
generate the user context data from the one or more images.

7. The system of claim 4, wherein the user context data is indicative of a distance between the user and the inventory location; and
further comprising computer-executable instructions to:
compare the distance to a threshold distance.

8. The system of claim 4, wherein the one or more sensors comprise cameras configured to acquire a plurality of images at a facility; and
further comprising computer-executable instructions to:
determine a location of the user within the facility using the plurality of images; and
wherein the user context data comprises the location of the user being proximate to the inventory location.

9. The system of claim 4, wherein the one or more sensors comprise weight sensors configured to acquire weight data of an object on a floor at a facility; and
further comprising computer-executable instructions to:
determine a location of the user within the facility using the weight data; and
wherein the user context data comprises the location of the user being proximate to the inventory location.

10. A method comprising:
generating, using a hardware processor, user context data associated with a gesture by a user of a facility;
generating, using the hardware processor and the user context data, force configuration data configured to direct a force mechanism associated with an inventory location to change a force directed to displacing one or more items towards a front of the inventory location, wherein the force mechanism comprises a pusher plate to come in contact with at least one of the one or more items and an actuator to produce a force to displace the pusher plate to push the one or more items towards the front of the inventory location; and
sending the force configuration data to the force mechanism.

11. The method of claim 10, further comprising:
actuating the force mechanism associated with the inventory location such that the force mechanism transitions from a first level of force as applied to the one or more items stowed at the inventory location to a second level of force.

* * * * *

UNITED STATES PATENT AND TRADEMARK OFFICE
CERTIFICATE OF CORRECTION

PATENT NO.        : 10,643,174 B1
APPLICATION NO.   : 14/567601
DATED             : May 5, 2020
INVENTOR(S)       : Marcus Hum Page 1 of 1

It is certified that error appears in the above-identified patent and that said Letters Patent is hereby corrected as shown below:

In the Claims

Column 38, Claim 1, Lines 19-24:
Currently reads: "responsive to the determination that the hand of the user is moving towards the inventory location, send a second signal to the force mechanism to apply a second force to the plurality of items held by the inventory location, wherein the second force is less than the first force."

Where it should read: --responsive to the determination, send a second signal to the force mechanism to apply a second force to the plurality of items held by the inventory location, wherein the second force is less than the first force.--

Signed and Sealed this
Thirtieth Day of June, 2020

Andrei Iancu
*Director of the United States Patent and Trademark Office*